US009090508B2

(12) United States Patent
Gong et al.

(10) Patent No.: US 9,090,508 B2
(45) Date of Patent: Jul. 28, 2015

(54) GEOPOLYMER COMPOSITE FOR ULTRA HIGH PERFORMANCE CONCRETE

(75) Inventors: Weiliang Gong, Rockville, MD (US); Werner Lutze, Chevy Chase, MD (US); Ian Pegg, Alexandria, VA (US)

(73) Assignee: The Catholic University of America, Washington, DC (US)

( * ) Notice: Subject to any disclaimer, the term of this patent is extended or adjusted under 35 U.S.C. 154(b) by 568 days.

(21) Appl. No.: 13/328,675

(22) Filed: Dec. 16, 2011

(65) Prior Publication Data
US 2012/0152153 A1 Jun. 21, 2012

Related U.S. Application Data

(60) Provisional application No. 61/457,052, filed on Dec. 17, 2010.

(51) Int. Cl.
C04B 14/06 (2006.01)
C04B 18/08 (2006.01)
C04B 28/00 (2006.01)

(52) U.S. Cl.
CPC ........... C04B 28/006 (2013.01); *C04B 2201/50* (2013.01)

(58) Field of Classification Search
CPC ............ C04B 7/243; C04B 7/26; C04B 7/28; C04B 7/367; C04B 12/005; C04B 14/06; C04B 14/066; C04B 14/068; C04B 14/106; C04B 14/42; C04B 14/303; C04B 14/28; C04B 18/08
USPC .................. 106/705, 713, 716, 718, 737, 738
See application file for complete search history.

(56) References Cited

U.S. PATENT DOCUMENTS

| 8,562,735 | B2* | 10/2013 | Allouche et al. | 106/705 |
|---|---|---|---|---|
| 2007/0125272 | A1* | 6/2007 | Johnson | 106/638 |
| 2007/0144407 | A1 | 6/2007 | Biscan et al. | |
| 2008/0028995 | A1* | 2/2008 | Barlet-Gouedard et al. | 106/811 |
| 2008/0058446 | A1 | 3/2008 | Guevara et al. | |
| 2008/0118637 | A1 | 5/2008 | Serwin | |
| 2009/0050022 | A1 | 2/2009 | Birch | |
| 2009/0071374 | A1 | 3/2009 | Van Deventer et al. | |
| 2009/0158970 | A1 | 6/2009 | Andersen et al. | |
| 2010/0010139 | A1 | 1/2010 | Davidovits et al. | |
| 2010/0071597 | A1 | 3/2010 | Perez-pena | |
| 2012/0024196 | A1* | 2/2012 | Gong et al. | 106/694 |

FOREIGN PATENT DOCUMENTS

| CN | 101560071 A | 10/2009 |
|---|---|---|
| CN | 101570426 A | 11/2009 |
| CN | 101792275 A | 8/2010 |
| JP | 06-211557 A | 8/1994 |

(Continued)

OTHER PUBLICATIONS

Uehara, Motoki, "Preparation and Properties of Environmentally Conscious Concrete Using Geopolymer Method," RTRP Report, Apr. 2008, 22(4):41-46, with English abstract on first page.

*Primary Examiner* — Paul Marcantoni
(74) *Attorney, Agent, or Firm* — Foley & Lardner LLP

(57) ABSTRACT

A geopolymer composite ultra high performance concrete (GUHPC), and methods of making the same, are provided herein, the GUHPC comprising: (a) a binder comprising one or more selected from the group consisting of reactive aluminosilicate and reactive alkali-earth aluminosilicate; (b) an alkali activator comprising an aqueous solution of metal hydroxide and metal silicate; and (c) one or more aggregate.

37 Claims, 1 Drawing Sheet

(56) References Cited

FOREIGN PATENT DOCUMENTS

| JP | 2004-168640 A | 6/2004 |
| JP | 2008-239446 A | 10/2008 |
| JP | 2010-532307 A | 10/2010 |
| WO | WO 2009/005205 A1 | 1/2009 |

\* cited by examiner

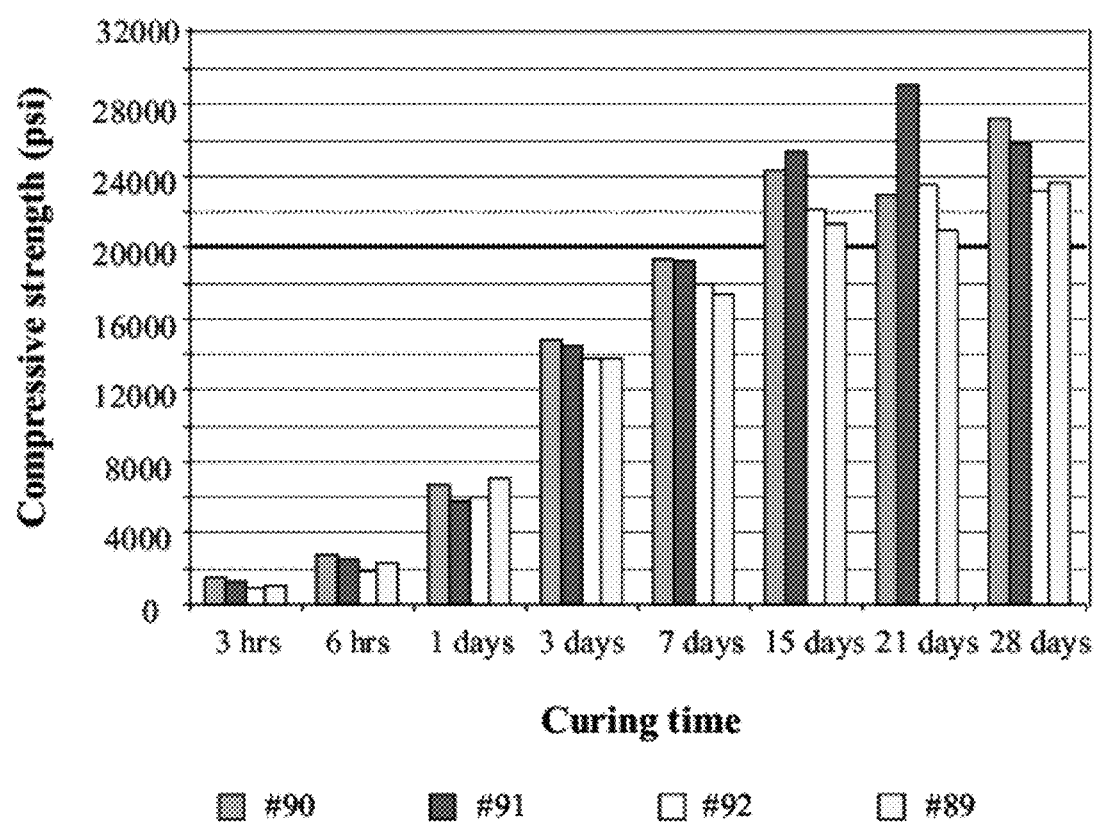

GEOPOLYMER COMPOSITE FOR ULTRA HIGH PERFORMANCE CONCRETE

CROSS REFERENCE TO RELATED PATENT APPLICATIONS

This application claims priority to U.S. Application Ser. No. 61/457,052, filed Dec. 17, 2010, incorporated herein by reference in its entirety.

FIELD OF THE INVENTION

The present invention relates to geopolymer composite binders for ultra high performance concrete and methods of making and using thereof.

BACKGROUND OF THE INVENTION

The following description of the background of the invention is provided simply as an aid in understanding the invention and is not admitted to describe or constitute prior art to the invention.

During the last ten years, considerable advances have been made in the development of high-performance, or more recently ultra-high-performance, concretes with Portland cement. Ultra high performance concrete (UHPC) represents a major development step over high performance concrete (HPC), through the achievement of very high strength and very low permeability. Typically, UHPC's compressive strength varies from about 120 to 400 MPa, its tensile strength varies from about 10 to 30 MPa, and its modulus of elasticity is in the range of about 60 to 100 GPa.

UHPC benefits from being a "minimum defect" material—a material with a minimum amount of defects such as micro-cracks and interconnected pores with a maximum packing density. One approach to minimizing defects is the Macro Defect Free (MDF) approach, which uses polymers to fill in pores in the concrete matrix. The process required to manufacture MDF concretes is very demanding, and includes laminating and pressing. MDF concretes are susceptible to water damage, have a large amount of creep, and are very fragile. Another approach to minimizing defects is the Densified with Small Particles (DSP) approach, which uses high amounts of superplasticizer and silica fume in the concrete mix. DSP concretes must either use extremely hard coarse aggregates or eliminate them entirely in order to prevent the aggregates from being the weakest component of the mix. DSP concretes do not require the extreme manufacturing conditions that MDF concretes do, but DSP concretes have a much lower tensile strength. Addition of steel fibers has been considered to improve the ductility of DSP concrete.

Principles employed in conventional UHPC include improved homogeneity through elimination of coarse aggregate; enhanced packing density by optimization of the granular mixture through a wide distribution of powder size classes; improved matrix properties by the addition of a pozzolanic admixture such as silica fume; improved matrix properties by reducing water/binder ratio; enhanced ductility through inclusion of small steel fibers; and enhanced mechanical performance through post-set heat-treatment (90-150° C.) to transform amorphous hydrates into crystalline products, making an improved microstructure (tobermorite, xonotlite) possible.

Several types of UHPC have been developed in different countries and by different manufacturers. The main difference between the various types of UHPC is the type and amount of fibers used. The four main types of UHPC are Ceracem/BSI, compact reinforced composites (CRC), multi-scale cement composite (MSCC), and reactive powder concrete (RPC). RPC is the most commonly available UHPC and one such product is currently marketed under the name Ductual® by Lafarge, Bouygues and Rhodia.

RPC concrete mixes usually contain fine sand (150-600 μm), Portland cement (<100 μm), silica fume (0.1-0.2 μm), crushed quartz (5-30 μm), short fibers, superplasticizer, and water. A typical RPC concrete mix has about 38.8% sand, 22.7% Portland cement, 10.6% silica fume, 8.1% crushed quartz, 2.0% steel fiber or organic fiber, 1.4% superplasticizer, and 16.5% water (all in volume percent).

Portland cement is the primary binder used in conventional UHPC, but at a much higher proportion as compared to ordinary concrete or HPC. Cement with high proportions of tricalcium aluminate ($C_3A$) and tricalcium silicate ($C_3S$), and a lower Blaine fineness are desirable for conventional UHPC, as the $C_3A$ and $C_3S$ contribute to high early strength and the lower Blaine fineness reduces the water demand. The addition of silica fume fulfills several roles including particle packing, increasing flowability due to spherical nature, and pozzolanic reactivity (reaction with the weaker hydration product calcium hydroxide) leading to the production of additional calcium silicates. Quartz sand with a maximum diameter of about 600 μm is the largest constituent aside from the steel fibers. Both the ground quartz (about 10 μm) and quartz sand contribute to the optimized packing By reducing the amount of water necessary to produce a fluid mix, and therefore permeability, the polycarboxylate superplasticizer also contributes to improving workability and durability. Finally, the addition of steel fibers aids in preventing the propagation of microcracks and macrocracks and thereby limits crack width and permeability.

Despite performance advantages offered by UHPC, deployment has been slow. There are several possible reasons for this, including lack of a clear financial benefit to manufacturers. As would be expected, the costs of fabricating UHPC components are significantly higher than the costs of manufacturing conventional concrete components. Additionally, the higher cost of constituent materials in UHPC necessarily means that UHPC has a higher per-unit volume cost than conventional and high-performance concretes. Much of the cost of UHPC comes from its steel fiber, superplasticizer, and high purity fumed silica. Ultra-high performance fiber reinforced concrete is generally cured with heat and/or pressure to enhance its properties and to accelerate the hydration reaction of the binder, which also increases manufacturing cost.

The present invention relates to use of geopolymer composite (GC) binders, rather than Portland cement, for Ultra High Performance Concrete (GUHPC) applications.

SUMMARY OF THE INVENTION

One aspect of the present invention provides geopolymeric composite ultra high performance concrete (GUHPC) mix, comprising: (a) a binder comprising one or more selected from the group consisting of reactive aluminosilicate and reactive alkali-earth aluminosilicate; and (b) an alkali activator comprising an aqueous solution of metal hydroxide and metal silicate, and (c) one or more aggregate.

In some embodiments, the binder comprises about 10 to 50 wt % of the GUHPC mix. In some embodiments, the binder comprises one or more reactive aluminosilicate comprising about 0 to 30 wt % of the GUHPC mix. In some related embodiments, the one or more reactive aluminosilicate is selected from the group consisting of metakaolin, reactive aluminosilicate glasses, and ultrafine Class F fly ash. In some embodiments, the one or more reactive aluminosilicate comprises metakaolin.

In some embodiments, the binder comprises one or more reactive alkali-earth aluminosilicate, comprising about 2 to 40 wt % of the GUHPC mix. In some related embodiments, the one or more reactive alkali-earth aluminosilicate is selected from the group consisting of granulated blast furnace slag, vitreous calcium aluminosilicate (VCAS), Class C fly ash, and concrete kiln dust. In some related embodiments, the one or more reactive alkali-earth aluminosilicate comprises ground granulated blast furnace slag.

In some embodiments, the binder comprises reactive aluminosilicate and reactive alkali-earth aluminosilicate. In some related embodiments, the mass of the reactive aluminosilicate is up to about 10 times, preferably up to about 1.5 times, preferably from about 0.2 to about 0.8 times, the mass of the reactive alkali-earth aluminosilicate. In some relate embodiments, the mass of the reactive alkali-earth aluminosilicate is up to about 20 times, preferably from about 2 to about 5 times, the mass of the reactive aluminosilicate. In some related embodiments, the one or more reactive aluminosilicate comprises about 2 to about 15 wt % of the GUHPC mix. In some related embodiments, the reactive alkali-earth aluminosilicate comprises about 8 to about 25 wt % of the GUHPC mix.

In some embodiments, the GUHPC mix further comprises one or more filler, comprising up to about 35 wt %, preferably from about 2 to about 25 wt %, of the GUHPC mix. In some related embodiments, the one or more filler comprise one or more reactive filler. In some related embodiments, the one or more filler is selected from the group consisting of crushed quartz powder, Class F fly ash, Class C fly ash, zeolite, ground waste glass, silica fume, ultrafine fly ash, precipitated silica, and micron alumina. In some related embodiments, the one or more filler comprises silica fume. In some related embodiments, the one or more filler comprises crushed quartz powder and silica fume. In some related embodiments, the one or more filler comprises Class C fly ash. In some related embodiments, the one or more filler comprises Class F fly ash. In some related embodiments, the one or more filler comprises silica fume and Class F fly ash. In some related embodiments, the one or more filler comprises silica fume and Class C fly ash. In some related embodiments, the one or more filler has a particle size of between 1 and 75 μm, and is selected from the group consisting of crushed quartz, Class F fly ash, Class C fly ash, zeolite, ground glass, metakaolin, ground granulated blast furnace slag, ultrafine furnace slag, and ultrafine fly ash. In some related embodiments, the one or more filler has a particle size of between about 0.05 and 1 μm, and is selected from the group consisting of silica fume, precipitated silica, ultrafine calcium carbonate, micron alumina, and submicron particles of metal oxides.

In some embodiments, the one or more aggregate comprises about 0 to 75 wt %, preferably about 30 to 60 wt % of the GUHPC mix. In some related embodiments, the one or more aggregate comprises particulate matter with a particle size of about 0.075 to 10 mm. In some related embodiments, the one or more aggregate comprises one or more coarse aggregate having a particle size of between about 0.075 and about 10 mm that is selected from the group consisting of quartz sand, granite, basalt, gneiss, crushed granulated blast furnace slag, limestone and calcined bauxite sand. In some related embodiments, the one or more aggregate comprises a fine aggregate with a particle size of between about 0.075 and 0.75 mm. In some related embodiments, the one or more aggregate comprises masonry sand, fine river sand, or both.

In some embodiments, the alkali activator solution comprises about 10 to 40 wt %, more preferably about 15 to about 25 wt %, of the GUHPC mix. In some embodiments, the metal hydroxide comprises about 2 to 15 wt % as $M_2O$ of the GUHPC mix. In some embodiments, the metal hydroxide comprises sodium hydroxide, potassium hydroxide, or both. In some embodiments, the metal hydroxide comprises about 2 to 10 wt % as $M_2O$ of the GUHPC mix. In some embodiments, water from the alkali activator solution comprises about 4 to 25 wt %, more preferably about 5 to 15 wt %, of the GUHPC mix.

In some embodiments, the metal silicate comprises about 2 to 10 wt % as $SiO_2$ of the GUHPC mix. In some embodiments, the metal silicate comprises an alkali metal silicate or an alkali earth metal silicate. In some embodiments, the metal silicate comprises sodium silicate, potassium silicate, or both.

In some embodiments, the GUHPC mix further comprises one or more fiber, comprising about 0 to 15 wt % of the GUHPC mix. In some related embodiments, the one or more fiber comprises one or more fiber selected from the group consisting of organic fiber, glass fiber, carbon fiber, nano fiber, and metal fiber. In some related embodiments, the one or more fiber comprises steel fiber.

In some embodiments, the GUHPC mix further comprises one or more strength enhancer, comprising up to about 2 wt % of the GUHPC mix. In some related embodiments, the one or more strength enhancer is selected from the group consisting of aluminum hydroxide, alkali carbonate, alkali phosphate, alkali sulfate, alkali oxalate, and alkali fluoride. In some related embodiments, the one or more strength enhancer is selected from the group consisting of aluminum hydroxide, sodium carbonate, sodium phosphate, sodium sulfate, sodium oxalate, and sodium fluoride.

In some embodiments, the GUHPC mix further comprises superplasticizer solids, comprising up to about 5 wt % of the GUHPC mix.

In some embodiments, the GUHPC mix further comprises a set retarder. In some related embodiments, the set retarder comprises up to about 5 wt % of the GUHPC mix.

In some embodiments, the packing density of all solid components in the GUHPC mix is at least 0.5 (v/v), such as at least 0.6 (v/v); such as at least 0.75 (v/v).

In some embodiments, the GUHPC mix results in a GUHPC product with a 28-day compressive strength of at least about 10,000 psi, such as at least about 20,000 psi, such as at least about 25,000 psi.

In some embodiments, the GUHPC mix results in a GUHPC product with a setting time of about 30 minutes to 3 hours.

In some embodiments, the GUHPC mix results in a GUHPC product with a setting temperature between about 0 and 150° C., such as between about 20 and 90° C.

In another aspect, methods of making geopolymeric composite ultra high performance concrete (GUHPC) products from GUHPC mixes described herein are provided. In some methods, a GUHPC dry mix is mixed with an activator solution to form a GUHPC paste; which is set and cured to form a GUHPC product. In these methods, the GUHPC dry mix comprises a binder at about 10 to 50 wt %, the binder comprising one or more selected from the group consisting of reactive aluminosilicate and reactive alkali-earth aluminosilicate, and the activator solution comprises an aqueous solution of metal hydroxide and metal silicate. The GUHPC dry mix further comprises one or more selected from the group consisting of aggregate, filler, and fiber.

In some embodiments, the alkali hydroxide comprises one or more of sodium hydroxide and potassium hydroxide or both.

In some embodiments, the mixing is conducted with an intensive mixer.

In some embodiments, the GUHPC paste further comprises one or more selected from the group consisting of strength enhancer, superplasticizer solids and set retarder.

In some embodiments, the GUHPC product comprises one or more fibers, which are added to the GUHPC pourable paste prior to setting.

In some embodiments, the GUHPC product comprises one or more strength enhancers, which are added to the aqueous solution of one or more alkali activators prior to mixing with the GUHPC dry mix.

In some embodiments, the activator solution has a molar concentration of alkali hydroxide from about 5 to about 15, preferably from about 7 to about 12.

In another aspect, methods of making a geopolymeric composite ultra high performance concrete (GUHPC) product from a GUHPC mix are provided where the components of a GUHPC mix are mixed in an intensive mixer until the mixture progresses through a granule like consistency and develops into a smooth pourable paste with continued mixing. In these embodiments, the GUHPC mix comprises an activator solution and a binder; the activator solution comprising an aqueous solution of metal hydroxide and metal silicate, the binder comprising one or more selected from the group consisting of reactive aluminosilicate and reactive alkali-earth aluminosilicate. In some embodiments, the GUHPC mix has a water to geopolymer solids ratio (W/C) of between about 0.12 to 0.65; such as between about 0.2 to 0.5; such as between about 0.3 to 0.45.

The term "about" as used herein in reference to quantitative measurements not including the measurement of the mass of an ion, refers to the indicated value plus or minus 10%. Unless otherwise specified, "a" or "an" means "one or more."

The summary of the invention described above is non-limiting and other features and advantages of the invention will be apparent from the following detailed description of the invention, and from the claims.

BRIEF DESCRIPTION OF THE DRAWINGS

FIG. 1 shows a plot of the compressive strength of various GUHPC samples as a function of curing time. Details are discussed in Example 14.

DETAILED DESCRIPTION OF THE INVENTION

One aspect described herein provides a geopolymer composite ultra high performance concrete (GUHPC) mix composition. At a minimum, a GUHPC mix includes: i) a binder comprising at least one reactive amorphous aluminosilicate material, such as metakaolin, and/or at least one reactive amorphous alkali-earth aluminosilicate, such as ground granulated blast furnace slag; and ii) an aqueous solution comprising at least one alkali activator.

In some embodiments, additional constituents may be included in the GUHPC mix. For example, (reactive and/or nonreactive) filler with a particle size up to about 75 μm, and/or aggregate, such as fine masonry sand of particle size between about 75 to 750 μm, such as about 250 μm may also be included in the mix. Additionally, constituents such as fibers, strength enhancers, superplasticizer, and set retarders may also be included to affect GUHPC performance.

To form a GUHPC, the dry constituents of the GUHPC mix composition (binder, and filler and aggregate, if present) are combined with an alkali activator solution. The constituents are mixed to form a pourable paste, which sets to a GUHPC product as the constituents form geopolymers. Geopolymers consist of silicon and aluminum atoms bonded via oxygen atoms into a polymer network. The process of forming geopolymers involves dissolution/condensation/poly-condensation/polymerization reactions, which begin as soon as certain reactive aluminosilicate materials are exposed to an alkaline solution. Using certain aluminosilicate materials that are highly reactive in alkaline solutions and optimizing compositions and properties of alkaline activator solutions allow one to produce very dense, durable geopolymer matrices of extremely high mechanical strength.

By employing certain principles true for conventional UHPC such as increased homogeneity by excluding coarse aggregates and an increased aggregate packing by selecting particle size distributions, a UHPC with geopolymer composite can be obtained with compressive strength above 20000 psi. Unlike conventional UHPC, use of heat treatment and addition of large amount of superplasticizer are not necessary to achieve ultra high performance. With an intensive mixer, water to geopolymer solids ratios (W/C) can be decreased without significant doping with a superplasticizer. In contrast, conventional UHPC uses large quantities of superplasticizer to lower W/C ratios. In addition, GUHPC has no Portland cement at all, uses mostly industrial waste, and does not emit carbon dioxide in production. Thus, GUHPC is much less expensive than conventional UHPC, while being a much greener concrete. GUHPC also exhibits much greater heat-, fire-, impact-, and acid-resistance than conventional UHPC.

Principles of GUHPC

It is well known that performance of geopolymer products depend on both the reactivity and mass of gel formed. The Inventors have found that alkali activation of reactive aluminosilicate materials, such as metakaolin, generates large amounts of alkali aluminosilicate gel (AAS gel).

Alkali activation of reactive alkali-earth aluminosilicate materials, such as ground granulated blast furnace slag, vitreous calcium aluminosilicate, or Class C fly ash, also produces abundant calcium silicate hydrate (CSH) gel and/or related gels and/or calcium aluminosilicate hydrate (CASH) gel, in addition to AAS gel.

Alkali activation of reactive aluminosilicate and reactive alkali-earth aluminosilicate are very quick with reactions completed in a few hours (e.g., metakaolin) to a few days (e.g., ground granulated blast furnace slag, Class C fly ash) at room temperature. Increasing temperature significantly enhances alkali activation and hardening processes.

The Inventors have also found that a geopolymer composite made of two or more reactive aluminosilicate materials results in a hybrid matrix of AAS, CSH and/or related gels, and/or calcium aluminosilicate hydrate (CASH) with a higher rate of strength gain as well as a higher final strength of the geopolymer product. Optimization of the AAS gel to CSH gel ratio in a geopolymer composite matrix can yield maximum strength performance.

Basic principles for conventional UHPC are also true for GUHPC, such as increased homogeneity by excluding coarse aggregates and an increased aggregate packing by selecting particle size distributions. In some embodiments, readily available fine river sand or masonry sand (e.g., particle size about 75 to 750 μm) may be used as fine aggregate in order to reduce production cost. In other embodiments, other sands, such as masonry sand, may be used as aggregate. In certain embodiments, one or more fine and/or ultrafine reactive fillers may be used having a particle size of between about 3 to 75 µm, thereby eliminating the crushed quartz powder (5 to 30 µm) found in typical reactive powder concrete (RPC) mixtures. In some embodiments, submicron fillers with a particle size ranging from about 0.05 to about 1 µm may be used. While the reactive fillers (fine, ultrafine, and submicron) act as filling the voids in the next larger granular class in the mix, the fillers also react with alkali sources (pozzolanic reaction) with increasing curing time and produce additional AAS gel to support long-term strength growth.

In some embodiments, the inclusion of aggregate and filler materials in the GUHPC mix results in a packing density of all solid additives (i.e., binder materials, aggregate (if present), and filler (if present)) of at least 0.5 (v/v); such as at least 0.6 (v/v); such as 0.75 (v/v).

Water/Geopolymer solids ratio (W/C) has been used as an indicator of concrete strength. The term geopolymer solids is defined as the sum of binder constituents and dissolved silica and alkali oxides in the activator solution. W/C affects porosity and pore size distributions of geopolymer matrix. A smaller W/C ratio usually results in a geopolymer gel with smaller pores (e.g., about 20 to 100 nm in size) and in turn higher compressive strength.

The inventors have determined that a GUHPC mix with optimal or near optimal W/C exhibits a characteristic progression through various stages under continued intensive mixing. With an optimal or near optimal W/C ratio, one observes that the GUHPC mix initially develops a sand or granule like consistency, which suggests an insufficient amount of water is present. However, continued mixing, without adding additional water, results in the sand or granule like mixture forming a mixture with dough like consistency, and finally a homogeneous, workable, flowable paste that is ready for pouring. The inventors have further determined that GUHPC products made from GUHPC mixes which exhibit this sequence are exceptionally strong, with compressive strength in excess of 20,000 psi cured for 28 days at room temperature.

The inventors have determined that the preferred W/C range for GUHPC mixes as described herein is within the range of about 0.12 to about 0.65; such as about 0.2 to about 0.5; such as about 0.3 to about 0.45.

The following is a more detailed description of various constituents that may be present in certain GUHPC mixes of the present invention. The constituents from which the GUHPC is made include at least a binder comprising at least one reactive aluminosilicate and/or at least one reactive alkali-earth aluminosilicate, and an aqueous activator solution. Additional components included in certain embodiments discussed herein include filler, aggregate, fiber, strength enhancers, superplasticizer, set retarder, and any combination thereof. This list is not intended to be exhaustive, and as understood by one of skill in the art, other components may also be included.

Reactive Aluminosilicate Materials

The first constituent in a GUHPC mix is the binder, which comprises reactive aluminosilicate and/or reactive alkali earth aluminosilicate. Examples of binder materials suitable for use in the present invention include Metakaolin (MK), Ground Granulated Blast Furnace Slag (GGBFS), Vitreous Calcium Aluminosilicate (VCAS), Class F fly ash (FFA), and Class C fly ash (CFA).

Metakaolin is one of the most reactive aluminosilicate pozzolans, a finely-divided material (e.g., within the range of about 0.1 to 20 microns) that reacts with slaked lime at ordinary temperature and in the presence of moisture to form strong slow-hardening cement. Metakaolin is formed by calcining purified kaolinite, generally between 650-700° C., in a rotary kiln. Alkali activation of metakaolin can be completed within several hours.

Fly ash is a fine powder byproduct formed from the combustion of coal. Electric power plant utility furnaces burning pulverized coal produce most of the commercially available fly ashes. These fly ashes consist mainly of glassy substantially spherical particles, as well as hematite, magnetite, unburned carbon, and some crystalline phases formed during cooling. American Society for Testing and Materials (ASTM) C618 standard recognizes two major classes of fly ashes for use in concrete: Class C and Class F. In the ASTM C618 standard, one major specification difference between the Class F fly ash and Class C fly ash is the lower limit of ($SiO_2+Al_2O_3+Fe_2O_3$) in the composition. The lower limit of ($SiO_2+Al_2O_3+Fe_2O_3$) for Class F fly ash is 70% and that for Class C fly ash it is 50%. Accordingly, Class F fly ashes generally have a calcium oxide content of about 15 wt % or less, whereas Class C fly ashes generally have a higher calcium oxide content (e.g., higher than 15 wt %, such as about 20 to 40 wt %). High calcium oxide content makes Class C fly ashes possess cementitious properties leading to the formation of calcium silicate and calcium aluminate hydrates when mixed with water.

Any reactive aluminosilicate known in the art may be used, but metakaolin is the most favorable as it is readily available and has small particle size, such as from about 0.5 to 20 µm. The rates of metakaolin dissolution and polymerization in an alkaline solution can be very high (i.e., from minutes to hours), and the water expelled during geopolymerization can help improve the workability of the GUHPC paste and enhance the alkali-activation/hydration of a reactive alkali-earth aluminosilicate.

Certain synthetic pozzolanic materials are even more reactive than metakaolin. For example, the inventors have synthesized reactive aluminosilicate glasses with chemical compositions analogous to that in Class F fly ash at temperatures between about 1400° C. and 1500° C. Raw materials useful for synthesis of reactive aluminosilicate glasses include Class F fly ash with addition of small amount of flux components (such as soda) or other individual chemicals. Prior to use in GUHPC mixes, synthetic glass may be ground passing 325 mesh. Alkali activation of the synthetic glass powders usually yields compressive strength over 20,000 psi after curing for 28 days.

In general, Class F fly ash is less reactive than metakaolin, though Class F fly ash is essentially an aluminosilicate glass. The reactivity of Class F fly ash depends on the amount of the amorphous phase contained therein, on the particle size of the spherical fly ash solid, and on curing temperature. According to the Inventors' measurements, the activation energy of hydration can be as high as about 100 kJ/mol for conventional Class F fly ash based geopolymer in the temperature range of about 20 to 75° C. By comparison, activation energies of hydration of Portland cements and furnace slag range from about 20 to 50 kJ/mol. Without post-set heat treatment, as usually applied to manufacture conventional UHPC, conventional Class F fly ash may not be a preferred reactive aluminosilicate in a GUHPC depending on particle size.

To be used as a reactive aluminosilicate in a GUHPC mix cured at room temperature, the Class F fly ash preferably has a particle size smaller than about 15 µm, as well as low amounts of unburnt carbon, such as less than about 1 wt %. Such Class F fly ashes preferably have a mean particle size of about 3 µm, and may be processed from raw fly ash by mechanical removal of coarser particles. Ultrafine fly ash can also be produced by a grinding process. Fly ashes with a median particle size in the 6 to 10 µm range may be generated in this way.

Reactive Alkali-Earth Aluminosilicate

As already discussed, the binder comprises reactive aluminosilicate and/or reactive alkali earth aluminosilicate. Examples of reactive alkali-earth aluminosilicate materials are ground granulated blast furnace slag (GGBFS), vitreous calcium aluminosilicate (VCAS), Class C fly ash (CFA), and cement kiln dust (CKD).

Depending on the chemical composition and method of production, ground granulated blast furnace slag (GGBFS) is a glassy granular material that varies from a coarse, popcorn-like friable structure with particle size greater than about 4.75 mm in diameter, to dense, sand-size grains. Grinding reduces the particle size to cement fineness, allowing its use as a supplementary cementitious material in Portland cement-based concrete. Typical ground granulated blast furnace slag includes about 27-38% $SiO_2$, 7-12% $Al_2O_3$, 34-43% CaO, 7-15% MgO, 0.2-1.6% $Fe_2O_3$, 0.15-0.76% MnO and 1.0-1.9% others by weight. Because GGBFS is almost 100% glassy (or "amorphous"), it is generally more reactive than most fly ashes. GGBFS produces a higher proportion of the strength-enhancing calcium silicate hydrate (CSH) than Portland cement, thereby resulting in higher ultimate strength than concrete made with Portland cement.

GGBFS is the most favorable reactive alkali-earth aluminosilicate due to its high reactivity in alkaline solution and its low cost. Although all three grades of furnace slag (i.e. 80, 100 and 120 by ASTM C989-92) are suitable for a GUHPC mix, furnace slag grade 120 is preferred because it exhibits higher reactivity in alkaline solution. Furthermore, ultrafine GGBFS is even more reactive compared to furnace slag grade 120. For example MC-500® Microfine® Cement (de neef Construction Chemicals) is an ultrafine furnace slag with particle sizes less than about 10 µm and specific surface area of about 800 $m^2$/kg that is more reactive than furnace slag grade 120.

VCAS is a waste product of fiberglass production. In a representative glass fiber manufacturing facility, typically about 10-20 wt % of the processed glass material is not converted to final product and is rejected as by-product or waste VCAS and sent for disposal to a landfill. VCAS is 100% amorphous and its composition is very consistent, mainly including about 50-55 wt % $SiO_2$, 15-20 wt % $Al_2O_3$, and 20-25 wt % CaO. Ground VCAS exhibits pozzolanic activity comparable to silica fume and metakaolin when tested in accordance with ASTM C618 and C1240. Therefore, it can be a very reactive alkali-earth aluminosilicate by forming additional cementitious compounds such as CSH and CASH gels.

CKD is a by-product of the manufacture of Portland cement, and therefore an industrial waste. Over 30 million tons of CKD are produced worldwide annually, with significant amounts put into land fills. Typical CKD contains about 38-64 wt % CaO, 9-16 wt % $SiO_2$, 2.6-6.0 wt % $Al_2O_3$, 1.0-4.0 wt % $Fe_2O_3$, 0.0-3.2 wt % MgO, 2.4-13 wt % $K_2O$, 0.0-2.0 wt % $Na_2O$, 1.6-18 wt % $SO_3$, 0.0-5.3 wt % Cl⁻, and 5.0-25 wt % LOI. CKD is generally a very fine powder (e.g., about 4600-14000 $cm^2$/g specific surface area) and is a good reactive alkali-earth aluminosilicate. When CKD is used in a GUHPC formulation, elevated concentrations of the alkali oxides contained in it enhance geopolymerization. Additional formation of CSH gel, ettringite ($3CaO.Al_2O_3.3CaSO_4.32H_2O$), and/or syngenite (a mixed alkali-calcium sulfate) can help develop early strength of GUHPC.

The concrete composition comprises about 2 to 40 wt % reactive alkali earth aluminosilicate, and preferably about 8 to 25 wt %. The concrete composition comprises up to 30 wt % reactive aluminosilicate. The binder materials comprises reactive alkali-earth aluminosilicate and reactive aluminosilicate, which contribute up to about 50 wt %, such as about 20 to 40 wt %, such as about 15 to 30 wt %, of a GUHPC mix.

In the binder, a mass ratio of reactive aluminosilicate to reactive alkali earth aluminosilicate ranges from about 0.0 to about 10; a mass ratio of between about 0.2 and about 0.8 is preferred.

In the binder, a mass ratio of reactive alkali earth aluminosilicate to reactive aluminosilicate of between about 0.0 to 20 is preferred; such as between about 1 to 10; such as between about 2 to 5.

Activator Solution

The second critical constituent in a GUHPC mix is the activator solution. In addition to the above described binder, an alkaline activation solution ("activator solution") must be added to a GUHPC dry constituent mixture to form a complete GUHPC mix. The activator is in effect a solution of one or more metal hydroxides and one or more metal silicates.

In one embodiment, the one or more metal hydroxides comprise one or more alkali metal hydroxides, such as sodium hydroxide, potassium hydroxide, or both.

The one or more metal silicates may comprise one or more alkali metal silicate and/or one or more alkaline earth metal silicate. Alkali metal silicates, particularly a mixed solution of potassium and sodium silicates, are desirable.

Silica fume or microsilica is composed of very small (e.g., about 0.1 µm in size) glassy silica particles ($SiO_2$) which are substantially spherical with a specific surface area on the order of 20 $m^2$/g. Silica fume is extremely reactive in alkaline solution. An activator solution is prepared by dissolving silica fume in alkali hydroxide solution. In some embodiments of the present invention, silica fume is also applied as a reactive filer. Unlike conventional Portland cement based UHPC, GUHPC is tolerant to unburned carbon present in industrial waste silica fume up to about 5 wt %, such as in silica fume from the production of silicon and ferrosilicon alloys. GUHPC made from such industrial waste silica fume may appear grey or darker in color. However, GUHPC comprising white silica fume, such as from the zirconium industry, contain much less unburnt carbon and appear white in color. Thus, certain colorants or pigments may be added to GUHPC made from white silica fume to achieve a variety of colors in the final product.

In some embodiments, silica fume may be used to make the activator solution by dissolving it in an alkali hydroxide solution, together with strength enhancers (if present). In other embodiments, alkali silicate glass powders may be dissolved in alkali hydroxide solution to prepare an activator solution. Elevated temperature may help increase rate of dissolution for alkali silicate glass powders. Examples of commercially available soluble alkali silicate glasses include SS® sodium silicate and Kasolv® potassium silicate from PQ Corporation. In other embodiments, commercially available alkali silicate solutions may be used to prepare activator solutions. Examples of such alkali silicate solutions include Ru™ sodium silicate solution and KASIL® 6 potassium silicate solution from PQ Corporation. When these commercial soluble alkali silicate materials are used to prepare activator solutions, the GUHPC products are usually light in color. If desired, certain pigments can be added to create various finishing colors.

The activator solution contributes to the GUHPC mix as follows: metal hydroxide as $M_2O$ (M=Na, K, or both) at about 2 to 15 wt %, silicate as $SiO_2$ at about 2 to 15 wt %, and water at 4 to 25 wt %.

Preferably, metal hydroxide is added as hydroxides of sodium, potassium, or both; more preferably, about 2 to 10 wt %, $Na_2O$ (added as NaOH), $K_2O$ (added as KOH), or both; more preferably, about 2 to 8 wt %, $Na_2O$ (added as NaOH), $K_2O$ (added as KOH), or both.

Preferably, $SiO_2$ is added as silica fume. Preferably, dissolved $SiO_2$ is present in the GUHPC mix at about 2 to 10 wt %, more preferably about 2 to 8 wt %

Preferably, water is present in the GUHPC mix at about 4 to 25 wt %; more preferably at about 7 to 15 wt %.

Filler

One optional constituent in a GUHPC mix is filler with a particle size up to about 75 µm. Two types of fillers can be classified in terms of their particle sizes and reactivity in alkaline solution. One type of filler comprises mainly reactive submicron particles having a particle size of between about 0.05 to 1 µm. Another type of filler comprises fine and ultrafine particles having particle sizes of between about 1 to 75 µm.

The combined filler may comprise up to about 35 wt % of a GUHPC mix. Preferably, the combined filler comprises between about 2 and 35 wt %. More preferably, the combined filler comprises between about 2 and 25 wt %.

Exemplary fine and ultrafine fillers include calcined zeolites, Class F fly ash, Class C fly ash, coal gasification fly ash, volcanic ash, and ground waste glass powder. In general, these filler particles are also quite reactive upon exposure to an alkaline solution. Fly ashes, including Class F and Class C fly ashes, usually have a particle size between about 5 and 75 µm. Fly ashes with smaller particle sizes are preferred, such as ultrafine fly ash (UFFA) with a mean particle size of about 1 to 10 µm. UFFA is carefully processed my mechanically separating the ultra fine fraction from the parent fly ash. Coal gasification fly ash is discharged from coal gasification power stations, usually as $SiO_2$ rich substantially spherical particles having a maximum particle size of about 5 to 10 µm. Thus, coal gasification fly ash is also suitable filler.

Class F fly ash is essentially an aluminosilicate glass that is less reactive than metakaolin in alkaline solution. The reactivity of Class F fly ash depends on the amount of the amorphous phase contained therein, on the particle size of the fly ash solid, and on curing temperature. According to the inventors' measurements, the activation energy of hydration can be as high as about 100 kJ/mol for Class F fly ash-based geopolymer in the temperature range of about 20 to 75° C. By comparison, activation energies of hydration of Portland cements range from about 20 to 50 kJ/mol. Class F fly ash may be used as filler as it usually has a mean particle size of less than 75 microns, thus allowing for the elimination of crushed quartz, one of the key components in conventional UHPC. Class F fly ash with lower unburned carbon (e.g., less than about 2 wt %) is preferred.

Metakaolin and ground granulated blast furnace slag may also be included as reactive filler while they function as the binder as well. Both of the materials have a particle size of between 0.5 and 75 µm. They fill in voids to improve the packing density of the GUHPC mix and react with the alkali silicate solution to form additional AAS and CSH and/or CASH gels.

Examples of zeolites include Zeolite Type 5A, Zeolite Type 13×, clinoptilolite, and phillipsite. The zeolite phases have molar $SiO_2/Al_2O_3$ ratios from about 2 to 7, which are within the favorable range of formation of geopolymer compositions. Heat treatment of zeolitic materials at temperatures between about 500 to 800° C. renders them amorphous in structure and reactive upon exposure to highly alkaline solution. Calcined zeolitic materials typically have a particle size between about 0.5 and 10 µm.

Exemplary submicron fillers useful in the present invention include silica fume, precipitated silica, and micron sized alumina, with silica fume being the most preferred. These submicron fillers typically are extremely reactive upon exposure to alkaline solution. Ultrafine calcium carbonate particles having a specific surface area equal to or greater than about 10 $m^2/g$ can also be used as submicron filler, though less reactive than silica fume. Other materials having a particle size less than about 1 µm may also be used as submicron filler, though they may not necessarily be reactive. Examples of such submicron particles include $Fe_2O_3$, $ZrO_2$, and SiC particles of appropriate size.

As used in conventional UHPC, crushed quartz powder having a particle size between about 1 and 75 µm, and more preferably between about 5 and 30 µm, may be used to enhance optimization of particle size distribution and is considered to be inert. However, crushed quartz may become relatively reactive in GUHPC as quartz particles with high surface area dissolve in highly alkaline solutions with pH>14. Therefore, in GUHPC mixes of the present invention, crushed quartz powder may be classified as weak reactive filler.

In some embodiments, a single filler, preferably a single reactive filler, is incorporated into a GUHPC mix. In some of these embodiments, the single filler is silica fume. In these embodiments, up to about 5 wt % silica fume is be incorporated into GUHPC mixes. In other embodiments, multiple fillers, which may or may not include one or more reactive fillers, are incorporated into GUHPC mixes. For example, two fillers may be incorporated into a GUHPC mix. In certain embodiments, silica fume and calcined Zeolite type 5A may be incorporated into a GUHPC mix with combined amounts of up to about 10 wt %. In other embodiments, silica fume and crushed quartz powder may be incorporated into a GUHPC mix with the amount of crushed quartz powder being up to about 25 wt %, such as up to about 10 wt %, and the amount of silica fume up to about 8 wt %, such as up to about 5 wt %. In yet other embodiments, silica fume and Class C fly ash may be incorporated into a GUHPC mix with the amount of silica fume up to about 8 wt %, such as up to about 5 wt %, and the amount of Class C fly ash up to about 25 wt %, such as up to about 10 wt %. In yet other embodiments, silica fume and Class F fly ash may be incorporated into a GUHPC mix with the amount of silica fume up to about 8 wt % and the amount of Class F fly ash up to about 25 wt %. In yet other embodiments, more than two, such as three, four, or more, fillers may be incorporated into a GUHPC mix.

In a GUHPC mix, fillers with different mean particle sizes and reactivities may be added together to achieve the highest packing density of a GUHPC mix and to enhance geopolymerization, which may lead to improvement of product performance. Both silica fume/fly ash (Class C and/or Class F) and silica fume/crushed quartz powder are preferable examples of such combinations.

Aggregate

A second optional constituent in a GUHPC mix is an aggregate. Aggregate confines the geopolymer matrix to add strength, and may be fine or coarse, with fine aggregates understood to have a particle size ranging from about 0.075 mm to 1 mm, such as from about 0.15 to 0.60 mm. If a fine aggregate is used in the GUHPC mix, any fine aggregate known in the art may be used. An exemplary fine aggregate is ordinary fine river sand, which may be added to a GUHPC mix at up to about 75 wt %, such as from about 30 to 60 wt %, such as from about 40 to 60 wt %, such as from about 25 to 55 wt %, such as up to about 50 wt %, such as from about 10 to 30%, such as from about 15 to 25 wt %.

Optionally, aggregate with a particle size between about 0.75 and 10 mm, such as between about 1 and 5 mm, such as between about 1 and 2 mm, may also added to a GUHPC mix at up to about 50 wt %, preferably together with fine aggregate. Examples of coarse aggregate include, but are not limited to, crushed quartz, granite, gneiss, basalt, limestone, and calcined bauxite sands.

Crushed granulated blast furnace slag having a particle size between about 0.1 and 10 mm may also be used as aggregate in a GUHPC mix. Stronger bonding between aggregate particles and the geopolymer matrix may be observed in such mixes due to high reactivity of furnace slag in alkaline solution.

Strength Enhancers

Optionally, at least one strength enhancer may be added into the activator solution at up to about 2 wt %, such as from about 0 to 3 wt %, such as from about 0 to 2 wt %, such as from about 0.5 to 1.5 wt %, or such as about 0 to 1.5 wt %, such as about 0 to 0.75 wt % of the GUHPC mix. Any strength enhancer known in the art, or combinations thereof, may be used. Exemplary strength enhancers include, but are not limited to, sodium fluoride, potassium fluoride, sodium sulfate, sodium oxalate, sodium phosphate and related compounds, and aluminum hydroxide.

Fibers for Reinforcement

Optionally, fiber can be added to a GUHPC mix up to about 15 wt %, such as up to about 10%, such as up to about 7.5 wt %, in order to secure desirable ductile behavior of the hardened product. Exemplary fibers include short fibers such as: organic fibers (e.g., polyvinyl alcohol fibers and polyacrylonitrile fibers); glass fibers (e.g., basalt fibers); carbon fibers; and metal fibers.

Metal fibers are preferred due to their substantial ductility and the increased ductility they confer on a GUHPC product. Metal fibers are generally chosen from steel fibers, such as high strength steel fibers and stainless steel fibers. The individual length of the metal fibers is generally at least 2 mm and is preferably between about 10 and 30 mm. The ratio of length to diameter of metal fibers used for reinforcement is typically within the range of about 10 to 300, and is preferably within the range of about 30 to 100. Fibers with a variable geometry (such as being crimped, corrugated, or hooked at the end) may be used. The bonding of metal fibers in the geopolymeric matrix may be improved by treating the surfaces of the fibers my methods known in the art, such as acidic etching or coating the fibers with ceramic layers. Dramix® steel fibers (such as 13 mm in length and 0.20 mm in diameter) from Bekaert Corporation are exemplary metal fibers which were used by the Inventors to prepare certain exemplary GUHPC products.

Water Reducers/Superplasticizer Solids

Optionally, water reducers or superplasticizer solids may be used to decrease the amount of water needed for preparing an activator solution for a GUHPC mix. Superplasticizer solids belong to a new class of water reducers capable of reducing water content by about 30% for Portland cement based concretes. More recent superplasticizers include polycarboxylic compounds, such as polyacrylates, although any superplasticizer known in the art may be used.

If included, superplasticizer solids are preferably used at up to about 5 wt %, such as up to about 2.5 wt %, such as up to about 1.5 wt %.

Set Retarders

Optionally, one or more set retarders (e.g., boric acid, certain commercial products such as Daratar 17 from Grace-Constructions, etc.) may be included to extend setting times of a GUHPC paste. Any set retarder known in the art may be included at appropriate levels.

Generic Preparation Method and Summary of Constituents

In one embodiment, the activator solution is prepared by dissolving silica fume in alkali hydroxide solution. Optionally, the activator solution may be aged with intermittent stirring. The dry constituents described above, except for the submicron filler, are premixed in an appropriate mixer, such as intensive mixer. Then, the alkaline activation solution, together with the superplasticizer (if any) and/or strength enhancer (if any), are poured into the dry mixture and mixed. With a near optimal W/C ratio, the dry mixture turns into a granule like mixture, which turns into a sand like mixture under continued mixing at high shear rate, e.g., at about 250 revolutions per minute or higher. Submicron filler, such as silica fume, is then added and mixed, and the sand like mixture turns into a dough like mixture which finally becomes a homogenous, workable, flowable, paste that is ready for pouring. Short fibers (if any) are preferably added near the end of the mixing process, such as along with the submicron filler or later.

The geopolymeric ultrahigh performance concretes (GUHPC) of the present invention may be manufactured by known methods, such as known methods of mixing dry constituents with an activator solution, shaping and placing (moulding, casting, injecting, pumping, extruding, roller compacting, etc.), curing and hardening. The process of curing GHUPC according to the present invention is not subject to any particular limitations. Any ordinary curing process may be used for cast in place and precast concretes.

The above constituents and their proportions in various GUHPC mixes are compiled and presented Tables 1 and 2.

TABLE 1

Constituents and their proportions in GUHPC mixes

| | Constituent | Range (wt %) |
|---|---|---|
| Binder | Reactive aluminosilicate or reactive alkali-earth aluminosilicate or both | 10-50 |
| Filler | | 0-35 |
| Aggregate | | 0-75 |
| Activator | $M_2O$ (M=K, Na, or both) | 2-15 |
| | $SiO_2$ | 2-15 |
| | Water | 4-25 |
| | Strength enhancer | 0-2 |
| Fiber | | 0-15 |
| Superplasticizer solids | | 0-5 |

TABLE 2

Constituents and their preferred proportions in GUHPC mixes

| Type of materials | Constituents | Range I (wt %) | Range II (wt %) |
|---|---|---|---|
| Binder | Reactive aluminosilicate | 0-30 | 2-15 |
| | Alkali-earth aluminosilicate | 2-40 | 8-25 |
| Filler | | 2-35 | 2-25 |
| Aggregate | | 15-75 | 30-60 |
| Activator | $M_2O$ (M=K, Na, or both) | 2-10 | 2-8 |
| | $SiO_2$ | 2-10 | 2-8 |
| | Water | 5-20 | 7-15 |
| | Strength enhancer | 0-1.5 | 0-0.75 |
| Fiber | | 0-10 | 0-7.5 |
| Superplasticizer solids | | 0-2.5 | 0-1.5 |

Constraining Parameters

Constraining parameters and their respective ranges can be used to define certain non-limiting formulations of GUHPC. Constraining parameters are set for the specific constituents used in the GUHPC mix.

In embodiments where metakaolin is used as a reactive aluminosilicate, the metakaolin constraining parameters include a set of molar ratios of $SiO_2/Al_2O_3$, $M_2O/Al_2O_3$, and $H_2O/M_2O$, where M represents one or more alkali metals (e.g., Na, K, Li) or alkali-earth metals. The $SiO_2/Al_2O_3$ molar ratio in metakaolin is about 2. Alkali hydroxide and alkali silicate are added to the solution to obtain the required values for the molar ratios characteristic of an activation solution. These characteristic molar ratios are $SiO_2/Al_2O_3$ from about 3.0 to 6.0, such as from about 3.25 to 4.5, such as from about 3.5 to 4.0; $M_2O/Al_2O_3$ from about 0.7 to 1.5, such as from about 0.9 to 1.25, or about 1.0 to 1.35; and $H_2O/M_2O$ from about 5.0 to 18.0, such as from about 5.0 to 14.0, such as about 6.0 to 10.0.

In embodiments where synthetic fly ash glass powder is used as a reactive aluminosilicate; vitreous calcium aluminosilicate is used as a reactive alkali-earth aluminosilicate; blast furnace slag is used as a reactive alkali-earth aluminosilicate; or some combination thereof, the constraining parameters are as follows. The constraining parameters include a set of mass fractions of $M_2O$, $SiO_2$, $H_2O$, and molar ratio $SiO_2/M_2O$ that are used to formulate an activation solution. Both reactive aluminosilicate and reactive alkali-earth aluminosilicate are pozzolanic materials responsible for forming a geopolymer matrix. Mass fractions of $M_2O$ or $SiO_2$ of the pozzolanic materials can range from about 0.03 to 0.15, such as about 0.05 to 0.10. The $SiO_2/M_2O$ molar ratio ranges from about 0.2 to 2.5, such as about 0.8 to 1.5. The mass fraction of $H_2O$ ranges from about 0.15 to 0.40, such as from about 0.25 to 0.30. Alkali metals can be any of Na, K, or Li, or any combination, with Na particularly useful for cost savings. The amounts of alkali hydroxide, alkali silicate, and water needed for the reactive components are summed up to formulate an activation solution composition.

Constraining parameters for CKD as a reactive alkali-earth aluminosilicate include the mass fractions of $SiO_2$ (dissolved silica or any source of amorphous silica material—e.g., micro-silica, silica fume, etc.), $Al_2O_3$ (dissolved aluminate, alumina, aluminum hydroxides, etc.), and $H_2O$. CKD is rich in free lime and gypsum, showing strong hydraulic pozzolanic property. The mass fractions of $SiO_2$ range from about 0.05 to 0.75, such as about 0.25 to 0.5. The mass fraction of $Al_2O_3$ ranges from about 0.00 to 1.0, and the mass fraction of water ranges from about 0.15 to 0.6, preferably from about 0.25 to 0.35. The resulting gel compositions will include CSH, ettringite, CASH, and AAS.

No constraining parameters are required for use of one or more of fumed silica, precipitated silica, alumina, or calcined zeolite as reactive filler if these reactive fillers are added into a GUHPC mix in a small amount, e.g., less than about 2 wt % of the mix. However, if the combined reactive fillers exceed 2 wt % of the mix, certain constraining parameters need be applied. Mass fractions of $M_2O$ for the indicated reactive fillers can range from about 0.0 to 0.10, such as about 0.025 to 0.05. The mass fraction of $H_2O$ ranges from about 0.0 to 0.15, such as from about 0.025 to 0.05.

In embodiments where fly ash is used as reactive filler, additional soluble silica may be added to the activator solution with mass fractions of $SiO_2$ of the reactive fillers ranging from about 0.0 to 0.10, such as about 0.025 to 0.05. The molar $SiO_2/M_2O$ ranges from about 0.2 to 2.5, such as about 0.8 to 1.5.

The water to geopolymer solids mass ratio (W/C) is a very important parameter for a GUHPC mix. As used herein, the term "geopolymer solids" is defined as sum of the masses of reactive constituents in the binder (i.e., reactive aluminosilicate and/or reactive alkali earth aluminosilicate) and masses of alkali oxide and silicon dioxide dissolved in the activator. The W/C ratio is determined by a set of constraining parameters such as the molar ratio $H_2O/M_2O$ for metakaolin (if present), mass fraction of $H_2O$ for reactive alkali-earth aluminosilicate and other reactive aluminosilicate materials other than metakaolin (if any), mass fraction of $H_2O$ for reactive fillers, as well as whether and how much a superplasticizer is applied. In certain examples presented herein, masonry sand with moisture of about 2.5 wt % is used as a fine aggregate. If the moisture content of the fine aggregate deviates from about 2.5 wt %, the mix must be corrected for the difference of $H_2O$. Typically, W/C ratios in GUHPC mixes range from about 0.12 to 0.65, such as about 0.20 to 0.50, such as about 0.30 to 0.45.

Table 3 shows general constraints and preferred values used to formulate the activator solution for a GUHPC mix.

TABLE 3

Constraints and preferred ranges for activator solution

| Constituents | Ratio or Material | Range | Preferred Range |
|---|---|---|---|
| Reactive aluminosilicate (molar ratio) | $SiO_2/Al_2O_3$ | 3.00-5.00 | 3.50-3.90 |
| | $M_2O/Al_2O_3$ | 0.70-1.50 | 1.00-1.35 |
| | $H_2O/M_2O$ (M=K, Na, or both) | 5-18 | 6.0-10.0 |
| Reactive alkali-earth aluminosilicate (mass ratio) | $H_2O/BFS^*$ | 0.15-0.40 | 0.25-0.30 |
| | $SiO_2/BFS^*$ | 0.03-0.15 | 0.07-0.09 |
| | $M_2O/BFS^*$ (M=K, Na, or both) | 0.03-0.15 | 0.07-0.09 |
| Reactive fillers (mass ratio) | $H_2O$/reactive filler (e.g. fly ash) | 0.-0.15 | 0.025 |
| | $M_2O$/reactive filler (e.g. fly ash) | 0-0.05 | 0-0.025 |

*BFS represents reactive alkali-earth aluminosilicate

Formulating GUHPC Mix

The following is a general approach to formulate a GUHPC mix. Firstly, the weight percents of aggregate, filler, fiber (if any), and superplasticizer solids (if any) are prescribed. Secondly, weight percents of the reactive alkali-earth aluminosilicate and the reactive aluminosilicate are set with a desired mass ratio. Thirdly, proportions of aggregate, filler, and binder may then be optimized in terms of the maximum density theory. The composition of an activation solution is formulated based on a set of constraining parameters and their respective ranges for the constituents (i.e., reactive aluminosilicate, reactive alkali-earth aluminosilicate, and certain reactive fillers) by summing the needed amounts of alkali hydroxide, dissolved silica, and/or dissolved alumina (if any), and water. Finally, binder (reactive aluminosilicate and/or reactive alkali-earth aluminosilicate), filler (if any), aggregate (if any), fiber (if any), superplasticizers (if any), set retarders (if any) and the activation solution are then normalized so that the total of the GUHPC mix composition amounts to 100% by weight.

In principle, the performance of GUHPC is at least partially dependent on the packing density of all of the particles from the dry constituents, including reactive aluminosilicate, reactive alkali earth aluminosilicate, aggregate, and filler. Because GUHPC products may be manufactured with locally available materials, it is beneficial to determine packing densities of trial samples with different proportions of constituents by use of both dry and wet packing methods. Compositions with higher particle packing densities may then be subject to further optimization processes.

Characteristic ratios of an activation solution include the W/C ratio; the activator to geopolymer solids ratio; the alkali oxide to geopolymer solids ratio; the soluble silica to geopolymer solids ratio; and the soluble silica to alkali oxide ratio, all by weight. The preferred ranges in these characteristic ratios are determined by constraining parameters and their respective ranges set for each of the GUHPC components where they apply.

The $M_2O$ (M=K, Na) to geopolymer solids ratio by weight is generally in the range of about 0.01 to 0.25, such as about 0.02 to 0.15, such as about 0.05 to 0.10. The $SiO_2$ to geopolymer solids ratio is generally in the range of about 0.01 to 0.25, such as about 0.03 to 0.25, such as about 0.02 to 0.20, such as 0.05 to 0.15. The $SiO_2$ to $Na_2O$ ratio by weight is generally in the range of about 0.1 to 2.0, such as about 0.5 to 1.5, such as about 0.75 to 1.25. The activator to geopolymer solids ratio by weight is generally in the range of about 0.20 to 1.25, such as about 0.50 to 1.0. The activator to total solid ratio is generally in the range of about 0.05 to 0.70, such as about 0.30 to 0.50. For an activation solution, the preferred metal silicate is a mixture of alkali silicates, such as K and Na with mass ratios of $K_2O/Na_2O$ from about 0 to 5; and the preferred alkali hydroxide is a mixture of alkali hydroxides, such as K and Na with mass ratios of $K_2O/Na_2O$ from about 0.1 to 3.

Molar concentrations of alkaline hydroxide (e.g., KOH and NaOH) in activator solution are generally in the range from about 5 to 15 M, preferably from about 7.5 to 12 M. The moisture present in the aggregate is generally included for such calculations.

Activator solution ranges from about 10 wt % to about 40 wt % of the concrete mix.

Manipulation of the constituent proportions within given ranges (see, e.g., Table 1) allows for optimization of the GUHPC mix compositions to achieve rapid strength growth and high final strength. GUHPC mixes described herein may be formulated for applications at ambient temperatures, or specifically formulated for any application at any other temperature commonly applied in construction industry, such as for pre-cast applications which usually require curing at elevated temperatures to achieve high production rates. One advantage of the GUHPC mixes described herein is that, in addition to the high compressive strength of the final product, thermal curing may not be necessary. The curing temperature may be lower than those for conventional UHPC. For example, curing can be carried out at less than or equal to about 250° C., such as less than or equal to about 100° C., such as less than or equal to about 75° C., such as less than or equal to about 50° C., such as less than or equal to about 45° C., such as less than or equal to about 30° C., such as less than or equal to about 25° C., such as less than or equal to about 20° C.

Initial setting time for GUHPC mixes described herein may be from about 0.5 to about 3 hours, such as about 0.5 to 1 hour. After the composition is set, it is cured for 24 hours or more, such as 24 hours to one week or longer, at a curing temperature between about 20° C. and about 75° C. Desired setting times can be achieved by optimization of binder and filler composition (e.g., by selecting binder and filler compositions with different reactivities in alkaline solutions), or by other methods known in the art.

The following Examples serve to illustrate the invention. These Examples are in no way intended to limit the scope of the methods.

EXAMPLES

In the following Examples, all GUHPC pastes were cured at room temperatures, e.g., at about 25° C., except were other curing temperatures are specified.

Masonry sand from Aggregates Industries was used as fine aggregate which has a particle size between 50 and 600 μm with a median size of about 250 μm. The moisture in the fine aggregate was about 2.5 wt % at ambient temperature. The moisture in the fine aggregate was included to calculate molar concentrations of alkali hydroxide and water to geopolymeric solids ratio. Actual moisture deviation from 2.5 wt % was corrected.

4 QROK was used as coarse quartz sand having a particle size between 0.6 and 1.7 mm, and Min U-SIL® was used as crushed quartz powder having a particle size between 1 to 25 μm with a median diameter of about 5 μm. Both quartz products were from U.S. Silica.

Metakaolin (Kaorock) was from Thiele Kaolin Company, Sandersville, Ga. The metakaolin had a particle size between 0.5 and 50 μm with 50 vol % less than 4 μm.

Ground granulated blast furnace slag grade 120 (NewCem Slag cement) was from Lafarge, North America Inc. (Baltimore Terminal). The furnace slag had a particle size between 0.5 to 60 μm, with 50 vol % less than 7 μm.

Silica fume, an industrial waste product from Fe—Si alloying, was from Norchem Inc. The silica fume contained 2.42 wt % carbon. The silica fume was used to prepare activator solutions by dissolving silica fume in alkali hydroxide solution, or added as submicron reactive filler.

One Class F fly ash (Micron³) was from Boral Material Technologies Inc. The Boral fly ash had a particle size between 0.5 and 125 μm with 50 vol % below 15 μm. Another Class F fly ash from Brandon Shores Power Station, Baltimore, Md., was from Separation Technologies LLC. The Brandon Shores fly ash had lower CaO (0.9 wt %) and a low Loss of Ignition (<1.5 wt %) and was marketed under ProAsh. The Brandon Shores fly ash had a particle size between 0.6 and 300 μm with 50 vol % below 26 μm. Another Class F fly ash from Limestone Power Station, Jewett, Tex., was from Headwater Resources. The Jewett fly ash contained about 12 wt % CaO and had a particle size between 0.5 and 300 μm with 50 vol % below 15 μm. Dramix® steel fibers (13 mm in length and 0.20 mm in diameter) from Bekaert Corporation were used to improve ductility.

Compressive strength was measured on a Test Mark CM-4000-SD compression machine, following the ASTM C39/C 39M method. During the testing, all samples were capped with rubber pads because the top and bottom surfaces were not sufficiently plane-parallel for bare measurement.

Example 1

KOH (90%) and NaOH (98%) were dissolved in tap water to make alkaline solution using a mechanical stirrer, and silica fume was dissolved in the KOH and NaOH solution. The silica fume from Norchem Inc. contained about 2.42 wt % carbon. The activator solution was black due to undissolved carbon. The activator solution was aged for about 2 days before sample preparation.

Masonry sand with about 2.5 wt % moisture was used as fine aggregate.

To prepare the GUHPC, the following constituents were first mixed dry:

Metakaolin as reactive aluminosilicate (12.65 wt %),

Ground granulated blast furnace slag as alkali-earth aluminosilicate (32.65 wt %), Calcined zeolite 13× and silica fume as reactive fillers (total 2 wt %), and Masonry sand as fine aggregate (19.00 wt %).

Then, an activator was prepared by mixing:

$Na_2O$ (2.52 wt %) as NaOH,
$K_2O$ (6.18 wt %) as KOH,
$SiO_2$ (8.44 wt %) as silica fume,
$H_2O$ (16.55 wt %), and
strength enhancers.

Strength enhancers used in the mixture included aluminum hydroxide, sodium carbonate, sodium phosphate, sodium sulfate, sodium oxalate and fluoride. Total addition was about 1.25 wt % of the concrete mix. These were dissolved in water prior to use.

The activator solution was mixed with the premixed dry constituents with a UNITEC EHR23 handheld mixer (maximum speed 275 rpm). During mixing, the following stages were observed: dry mixture, sand-like mixture, granule-like mixture, dough-like mixture, and finally the dough-like mixture became a thin paste that could be poured, indicating that the mix had a near optimal or optimal W/C ratio. The workable time of the final stage (the thin paste) was about 50 min.

The paste was filled into cylindrical molds (2 by 4 inches), vibrated while filling for about 3 minutes for bubbles to escape, and then cured at room temperature. After 24 hours, the cylinders were de-molded and stored at room temperature. After curing for 28 days, compressive strength of the samples was measured to be 23341 psi.

Example 2

A second exemplary GUHPC was prepared as follows.

KOH (90%) and NaOH (98%) were dissolved in tap water to make alkaline solution using a mechanical stirrer, and high purity silica fume (about 99.5 wt %) from Cabot Corporation was dissolved in the KOH and NaOH solution.

Sodium fluoride, used as a strength enhancer, was first dissolved in tap water. The addition was about 0.5 wt % of the concrete mix.

The following constituents (unless otherwise indicated, obtained from the sources indicated above) were mixed dry:

Metakaolin as reactive aluminosilicate (12.87 wt %),

Ground granulated blast furnace slag as alkali-earth aluminosilicate (33.20 wt %), Calcined zeolite 13× and silica fume as reactive fillers (total 2 wt %), Sodium fluoride as strength enhancer (about 0.6 wt % of the dry GUHPC), and Masonry sand as fine aggregate (19.00 wt %).

Then, an activator was prepared by mixing:

$Na_2O$ (2.57 wt %) as NaOH,
$K_2O$ (6.28 wt %) as KOH,
$SiO_2$ (8.59 wt %) as silica fume, and
$H_2O$ (15.50 wt %).

Superplasticizer ADVA 140M from Grace Constructions was added to the activator before mixing with the premixed dry components. The dose of superplasticizer was about 1500 ml per 100 kg dry product.

During mixing of the dry constituents with the activator solution, the same stages (dry mixture, sand-like mixture, granule-like mixture, dough-like mixture, and finally a thin paste) were observed. The workable time of the final stage (the thin paste) was about 50 min. As in Example 1, samples were poured, cured at room temperature, de-moulded after curing 24 hours, and stored at room temperature. After curing for 28 days, compressive strength of the samples was measured to be 21248 psi.

Example 3

Using the same procedure described in Example 1, with no superplasticizer added, additional GUHPC samples (Samples 3-9) were prepared to test effect of individual strength enhancers in activator solution. Individual strength enhancers evaluated in Samples 2-4 and 6-9 were tin fluoride, sodium fluoride, sodium oxalate, sodium sulfate, and aluminum hydroxide. Each addition was about 0.5 wt % of the concrete mixes. No strength enhancer was included in Sample 5. The compressive strengths were measured after curing for 28 days. All samples measured above 20,000 psi in compressive strength. The composition, W/C, concentration of alkali hydroxides in activator solution, and compression strength of the additional samples are shown in Table 4.

TABLE 4

Composition (wt %), W/C, molar concentration of alkali hydroxides in activator solution, and compression strength (psi) from GUHPC samples*

| | Dry components | | | | | Activator | | | | | | |
|---|---|---|---|---|---|---|---|---|---|---|---|---|
| Sample | MK | BFS | SFF | ZT | Sand | $K_2O$ | $SiO_2$ | $Na_2O$ | Water | Sum | W/C | (K,Na)OH M | psi |
| #3 | 13.02 | 33.60 | 1.01 | 1.01 | 19.23 | 5.15 | 8.69 | 2.60 | 15.69 | 100.00 | 0.26 | 11.94 | 21049 |
| #4 | 12.78 | 32.97 | 1.01 | 1.01 | 19.23 | 5.07 | 8.54 | 2.55 | 16.85 | 100.00 | 0.28 | 10.95 | 20693 |
| #5 | 12.80 | 33.03 | 1.01 | 1.01 | 19.23 | 5.07 | 8.55 | 2.55 | 16.75 | 100.00 | 0.28 | 11.03 | 20617 |
| #6 | 12.80 | 33.03 | 1.01 | 1.01 | 19.23 | 5.07 | 8.55 | 2.55 | 16.75 | 100.00 | 0.28 | 11.03 | 20144 |
| #7 | 12.80 | 33.03 | 1.01 | 1.01 | 19.23 | 5.07 | 8.55 | 2.55 | 16.75 | 100.00 | 0.28 | 11.03 | 20989 |
| #8 | 12.80 | 33.03 | 1.01 | 1.01 | 19.23 | 5.07 | 8.55 | 2.55 | 16.75 | 100.00 | 0.28 | 11.03 | 20281 |
| #9 | 12.80 | 33.03 | 1.01 | 1.01 | 19.23 | 5.07 | 8.55 | 2.55 | 16.75 | 100.00 | 0.28 | 11.03 | 20700 |

*SFF = silica fume filler; ZT = zeolite; $Na_2O$ and $K_2O$ added as hydroxides, and $SiO_2$ added as silica fume (e.g., Fe—Si alloying waste product) to prepare activator solutions Example 4

Using the same procedure described in Example 1, additional GUHPC samples (Samples 10-16) were prepared. Their compressive strengths were measured after curing for 28 days. About 1.2 wt % of superplasticizer solids (ADVA Cast 575 from Grace Constructions) was added to reduce water demand and to improve flowability of the pastes. Strength enhancers including sodium fluoride, sodium oxalate, sodium sulfate, and aluminum hydroxide together were added at about 1.15 wt %. In Sample 13, steel fiber from Bekaert Corporation at about 2 wt % (not shown in Table 5) was added at the last step of mixing to improve ductility. The composition, W/C, concentration of alkali hydroxides in activator solution, and compressive strengths of the additional samples are shown in Table 5.

TABLE 5

Composition (wt %), W/C, molar concentration of alkali hydroxides in activator
solution, and compression strength (psi) from additional GUHPC samples*

| Sample | Dry components | | | | | Activator solution | | | | | Sum | W/C | (K,Na)OH M | psi |
| --- | --- | --- | --- | --- | --- | --- | --- | --- | --- | --- | --- | --- | --- | --- |
| | MK | BFS | SFF | ZT | Sand | $K_2O$ | $SiO_2$ | $Na_2O$ | SP | Water | | | | |
| #10 | 10.46 | 27.00 | 2.00 | 1.00 | 29.97 | 4.66 | 6.98 | 2.15 | 1.20 | 14.58 | 100.00 | 0.30 | 10.97 | 21653 |
| #11 | 9.67 | 24.95 | 2.00 | 1.00 | 34.97 | 4.32 | 6.46 | 2.00 | 1.20 | 13.44 | 100.00 | 0.30 | 10.90 | 21970 |
| #12 | 8.87 | 22.89 | 2.00 | 1.00 | 39.97 | 3.95 | 5.92 | 1.84 | 1.20 | 12.35 | 100.00 | 0.31 | 10.74 | 21930 |
| #13 | 8.44 | 21.77 | 1.97 | 0.99 | 39.46 | 4.17 | 5.64 | 1.76 | 1.18 | 12.65 | 100.00 | 0.33 | 10.65 | 20468 |
| #14 | 11.26 | 29.07 | 2.00 | 1.00 | 24.98 | 5.01 | 7.51 | 2.30 | 1.20 | 15.67 | 100.00 | 0.30 | 11.09 | 20454 |
| #15 | 12.06 | 31.12 | 2.00 | 1.00 | 19.98 | 5.38 | 8.05 | 2.46 | 1.20 | 16.76 | 100.00 | 0.29 | 11.22 | 20488 |
| #16 | 7.17 | 18.50 | 1.97 | 0.98 | 49.23 | 3.20 | 4.78 | 1.51 | 1.18 | 11.48 | 100.00 | 0.36 | 9.17 | 19326 |

*SFF = silica fume filler; ZT = zeolite; SP = superplasticizer solids; $Na_2O$ and $K_2O$ added as respective hydroxides, and $SiO_2$ added as silica fume (e.g., Fe—Si alloying waste product) to prepare activator solutions

Example 5

Using the same procedure described in Example 1, additional GUHPC samples (Samples 17-33) were prepared. The samples were cured at room temperature and their compressive strengths were measured after curing for 28 days. Crushed quartz (QZ) with a mean particle size of 15 μm from U.S. Silica was used as a weak reactive filler to improve packing density of the products. No superplasticizer was added. In Samples 18, 23, 29, and 32, about 2 wt % steel fiber from Bekaert Corporation was added to improve ductility. In Samples 20-22, molar Fluoride (F)/Si in activator solution was increased from 0.2, to 0.3, and 0.4, respectively, to test effect of fluoride concentration on the performance. Correspondingly, sodium fluoride was increased from 0.90, 1.35, to 1.79 wt % of the concrete mix. The composition, W/C, concentration of alkali hydroxides in activator solution, and compressive strengths of the additional samples are shown in Table 6.

Example 6

Using the same procedure described in Example 1, additional GUHPC samples (Samples 34-42) were prepared. The samples were cured at room temperature and their compressive strengths were measured after curing for 28 days. In these samples, masonry sand was used as the fine aggregate, and silica fume and zeolite together were added as reactive fillers. Strength enhancers including sodium fluoride, sodium oxalate, sodium sulfate, and aluminum hydroxide together were added at about 1.15 wt % of the concrete mix in Samples 34-40. Sodium fluoride and sodium oxalate were added at about 0.8 wt % of the concrete mix in Samples 41 and 42. No superplasticizer was added. In Sample 40, steel fiber from Bekaert Corporation was added to improve ductility. The composition, W/C, concentration of alkali hydroxides in activator solution, and compressive strengths of the additional samples are shown in Table 7.

TABLE 6

Composition (wt %), W/C, molar concentration of alkali hydroxides in activator
solution, and compression strength (psi) from additional GUHPC samples*

| Sample | Dry components | | | | | | | Activator | | | | Sum | (K,Na)OH M | W/C | psi |
| --- | --- | --- | --- | --- | --- | --- | --- | --- | --- | --- | --- | --- | --- | --- | --- |
| | MK | BFS | SFF | ZT | QZ | Sand | Fiber | $K_2O$ | $SiO_2$ | $Na_2O$ | Water | | | | |
| #17 | 8.84 | 22.81 | 2.98 | — | 6.95 | 34.75 | — | 3.96 | 5.91 | 1.79 | 12.03 | 100.00 | 11.98 | 0.30 | 24094 |
| #18 | 7.48 | 19.29 | 2.95 | — | 7.87 | 39.33 | 1.97 | 3.33 | 4.99 | 1.52 | 11.29 | 100.00 | 9.75 | 0.34 | 24961 |
| #19 | 9.63 | 24.85 | 3.00 | — | 5.99 | 29.97 | — | 4.33 | 6.44 | 1.94 | 13.84 | 100.00 | 10.59 | 0.31 | 20469 |
| #20 | 9.63 | 24.85 | 3.00 | — | 5.99 | 29.97 | — | 4.33 | 6.44 | 1.94 | 13.84 | 100.00 | 10.59 | 0.31 | 24212 |
| #21 | 9.63 | 24.85 | 3.00 | — | 5.99 | 29.97 | — | 4.33 | 6.44 | 1.94 | 13.84 | 100.00 | 10.59 | 0.31 | 23370 |
| #22 | 9.63 | 24.85 | 3.00 | — | 5.99 | 29.97 | — | 4.33 | 6.44 | 1.94 | 13.84 | 100.00 | 10.59 | 0.31 | 20910 |
| #23 | 7.28 | 18.79 | 1.96 | 0.98 | 7.84 | 39.19 | 1.96 | 3.47 | 4.87 | 1.53 | 12.13 | 100.00 | 9.39 | 0.36 | 24150 |
| #24 | 7.68 | 19.82 | 1.98 | 0.99 | 7.93 | 39.64 | — | 3.59 | 5.13 | 1.62 | 11.62 | 100.00 | 10.17 | 0.33 | 23459 |
| #25 | 10.26 | 26.47 | 1.99 | 0.99 | 4.97 | 24.86 | — | 4.64 | 6.86 | 2.25 | 16.71 | 100.00 | 9.87 | 0.34 | 21929 |
| #26 | 11.37 | 29.33 | 1.97 | 0.98 | 3.94 | 19.69 | — | 5.27 | 7.59 | 2.32 | 17.54 | 100.00 | 10.36 | 0.32 | 20657 |
| #27 | 6.65 | 17.15 | 1.97 | 0.98 | 8.86 | 44.28 | — | 3.18 | 4.45 | 1.41 | 11.08 | 100.00 | 9.27 | 0.37 | 26005 |
| #28 | 6.48 | 16.73 | 2.00 | 1.00 | 9.00 | 45.00 | — | 3.19 | 4.33 | 1.61 | 10.65 | 100.00 | 10.16 | 0.36 | 24698 |
| #29 | 5.95 | 15.36 | 2.00 | 1.00 | 9.00 | 45.00 | 2.00 | 3.00 | 3.97 | 1.67 | 11.05 | 100.00 | 9.65 | 0.41 | 23188 |
| #30 | 5.70 | 14.71 | 1.97 | 0.98 | 9.84 | 49.19 | — | 2.76 | 3.81 | 1.23 | 9.82 | 100.00 | 8.89 | 0.39 | 21717 |
| #31 | 8.39 | 21.64 | 1.99 | 0.99 | 6.96 | 34.80 | — | 3.82 | 5.61 | 1.86 | 13.94 | 100.00 | 9.53 | 0.36 | 22955 |
| #32 | 5.12 | 13.21 | 2.00 | — | 10.00 | 50.00 | 2.00 | 2.95 | 3.49 | 1.24 | 10.00 | 100.00 | 9.12 | 0.43 | 21487 |
| #33 | 4.29 | 11.07 | 1.95 | 1.00 | 10.71 | 53.53 | — | 2.39 | 2.86 | 1.13 | 11.10 | 100.00 | 7.03 | 0.57 | 21456 |

*SFF = silica fume filler; ZT = zeolite; Fiber = steel fiber; QZ = crushed quartz; $Na_2O$ and $K_2O$ added as hydroxides, and $SiO_2$ added as silica fume (e.g., Fe—Si alloying waste product) to prepare activator solutions

TABLE 7

Composition (wt %), W/C, molar concentration of alkali hydroxides in activator solution, and compression strength (psi) from additional GUHPC samples*

| Sample | Dry components | | | | | | Activator | | | | Sum | (K,Na)OH M | W/C | psi |
|---|---|---|---|---|---|---|---|---|---|---|---|---|---|---|
| | MK | BFS | SFF | ZT | Sand | Fiber | $K_2O$ | $SiO_2$ | $Na_2O$ | Water | | | | |
| #34 | 10.20 | 26.32 | 2.00 | 1.00 | 29.97 | — | 4.56 | 6.94 | 2.24 | 16.77 | 100.00 | 9.65 | 0.35 | 20667 |
| #35 | 9.41 | 24.28 | 1.99 | 0.99 | 34.81 | — | 4.62 | 6.41 | 2.07 | 15.41 | 100.00 | 10.14 | 0.35 | 20672 |
| #36 | 8.60 | 22.20 | 2.00 | 1.00 | 39.96 | — | 3.88 | 5.86 | 2.07 | 14.44 | 100.00 | 9.66 | 0.36 | 20746 |
| #37 | 7.85 | 20.26 | 2.00 | 1.00 | 44.97 | — | 3.52 | 5.35 | 1.91 | 13.15 | 100.00 | 9.55 | 0.37 | 20775 |
| #38 | 11.16 | 28.79 | 2.00 | 1.00 | 25.00 | — | 5.47 | 7.60 | 2.43 | 16.55 | 100.00 | 11.33 | 0.31 | 20414 |
| #39 | 7.14 | 18.42 | 2.00 | 1.00 | 50.12 | — | 3.72 | 4.86 | 1.70 | 11.03 | 100.00 | 10.89 | 0.34 | 21432 |
| #40 | 5.96 | 15.38 | 2.00 | 1.00 | 55.00 | 2.00 | 3.29 | 4.06 | 1.46 | 9.85 | 100.00 | 10.43 | 0.37 | 20400 |
| #41 | 7.13 | 18.40 | 2.00 | 1.00 | 50.00 | — | 3.78 | 4.76 | 1.58 | 11.35 | 100.00 | 10.41 | 0.35 | 21296 |
| #42 | 6.30 | 16.26 | 2.00 | 1.00 | 55.00 | — | 3.39 | 4.21 | 1.49 | 10.35 | 100.00 | 10.23 | 0.37 | 20475 |

*SFF = silica fume filler; ZT = zeolite; Fiber = steel fiber; $Na_2O$ and $K_2O$ added as respective hydroxides, and $SiO_2$ added as silica fume (e.g., Fe—Si alloying waste product) to prepare activator solutions Example 7

Using the same procedure described in Example 1, additional GUHPC samples (Samples 43-48) were prepared. The samples were cured at room temperature and their compressive strengths were measured after curing for 28 days. In these samples, masonry sand was used as the fine aggregate, and silica fume and/or zeolite were added as reactive fillers. Strength enhancers including sodium fluoride, sodium oxalate, sodium sulfate, and aluminum hydroxide together were added at about 1.15 wt % of the concrete mix in Samples 43-45. Sodium fluoride and/or sodium oxalate were added as strength enhancers at about 0.7 wt % of the concrete mix in Samples 46-48. No superplasticizer was added. Class F fly ash from Boral Material Technologies was used as reactive filler. The composition, W/C, concentration of alkali hydroxides in activator solution, and compressive strengths of the additional samples are shown in Table 8.

Example 8

Using the same procedure described in Example 1, additional GUHPC samples (Samples 49-52) were prepared. The samples were cured at room temperature and their compressive strengths were measured after curing for 28 days. In these samples, masonry sand was used as fine aggregate, and silica fume and/or zeolite were added as reactive filler. Crushed quartz (QZ) with a mean particle size of 15 μm from U.S. Silica was used as weak reactive filler. Additionally, coarse quartz sand (#4 Q-ROK) from U.S. Silica was added to improve packing density. Strength enhancers used in these samples included aluminum hydroxide, sodium carbonate, sodium phosphate, sodium sulfate, sodium oxalate, and fluoride. Total addition of strength enhancers was about 0.85 wt % of the concrete mix in Samples 49 and 51. Sodium fluoride alone was added as a strength enhancer at about 0.25 wt % of the concrete mix in Samples 50 and 52. No superplasticizer was added. The composition, W/C, concentration of alkali hydroxides in activator solution, and compressive strengths of the additional samples are shown in Table 9.

TABLE 8

Composition (wt %), W/C, molar concentration of alkali hydroxides in activator solution, and compression strength (psi) from additional GUHPC samples*

| Sample | Dry components | | | | | | Activator | | | | Sum | (K,Na)OH M | W/C | psi |
|---|---|---|---|---|---|---|---|---|---|---|---|---|---|---|
| | MK | BFS | SFF | ZT | FAF | Sand | $K_2O$ | $SiO_2$ | $Na_2O$ | Water | | | | |
| #43 | 4.61 | 11.90 | 2.00 | — | 10.00 | 55.00 | 2.50 | 3.14 | 1.70 | 9.15 | 100.00 | 10.26 | 0.44 | 22624 |
| #44 | 6.26 | 16.15 | 2.00 | 1.00 | 9.00 | 45.00 | 3.07 | 4.34 | 1.73 | 11.45 | 100.00 | 9.63 | 0.40 | 22862 |
| #45 | 7.16 | 18.49 | 2.00 | 1.00 | 8.00 | 40.00 | 3.52 | 4.97 | 1.91 | 12.95 | 100.00 | 9.77 | 0.39 | 22235 |
| #46 | 4.77 | 12.32 | 2.96 | — | 8.89 | 54.36 | 2.65 | 3.09 | 1.46 | 9.52 | 100.00 | 9.50 | 0.45 | 21652 |
| #47 | 4.68 | 12.08 | 2.00 | — | 10.00 | 55.00 | 2.58 | 3.19 | 1.72 | 8.75 | 100.00 | 10.88 | 0.42 | 19970 |
| #48 | 4.39 | 11.33 | 2.00 | 2.00 | 5.00 | 60.00 | 2.46 | 2.99 | 1.59 | 8.25 | 100.00 | 10.60 | 0.43 | 23007 |

*SFF = silica fume filler; ZT = zeolite; FFA = Class F fly ash; $Na_2O$ and $K_2O$ added as hydroxides, and $SiO_2$ added as silica fume (e.g., Fe—Si alloying waste product) to prepare activator solutions

TABLE 9

Composition (wt %), W/C, molar concentration of alkali hydroxides in activator solution, and compression strength (psi) from additional GUHPC samples*

| | Dry components | | | | | | Activator | | | | | | |
|---|---|---|---|---|---|---|---|---|---|---|---|---|---|
| Sample | MK | BFS | SFF | CA | QZ | Sand | K₂O | SiO₂ | Na₂O | Water | Sum | (K,Na)OH M | W/C | psi |
| #49 | 5.84 | 15.06 | 2.98 | 35.11 | 6.50 | 14.96 | 3.13 | 4.05 | 1.35 | 11.02 | 100.00 | 9.66 | 0.36 | 21892 |
| #50 | 7.54 | 19.47 | 1.99 | 29.61 | 5.48 | 12.61 | 4.12 | 5.23 | 1.29 | 12.65 | 100.00 | 9.96 | 0.38 | 22699 |
| #51 | 6.68 | 17.24 | 2.98 | 32.06 | 5.94 | 13.65 | 3.43 | 4.63 | 1.54 | 11.86 | 100.00 | 10.04 | 0.34 | 20169 |
| #52 | 5.06 | 13.05 | 2.98 | 38.17 | 7.07 | 16.26 | 2.73 | 3.51 | 1.25 | 9.94 | 100.00 | 9.49 | 0.40 | 20561 |

*SFF = silica fume filler; CA = coarser aggregate; QZ = crushed quartz; Fiber = steel fiber; Na₂O and K₂O added as respective hydroxides, and SiO₂ added as silica fume (e.g., Fe—Si alloying waste product) to prepare activator solutions

Example 9

Using the same procedure described in Example 1, additional GUHPC samples (Samples 53-56) were prepared. The samples were cured at room temperature and their compressive strengths were measured after curing for 28 days. In these samples, masonry sand was used as fine aggregate; and silica fume was added as submicron reactive filer. Crushed quartz (QZ) from U.S. Silica was used as weak reactive filler. Sodium fluoride (NaF) at about 0.25 wt % of the concrete mix was added as a strength enhancer. No superplasticizer was added. In Sample 55, steel fiber from Bekaert Corporation was added to improve ductility. The composition, W/C, concentration of alkali hydroxides in activator solution, and compressive strengths of the additional samples are shown in Table 10.

TABLE 10

Composition (wt %), W/C, molar concentration of alkali hydroxides in activator solution, and compression strength (psi) from additional GUHPC samples*

| | Dry components | | | | | | Activator | | | | | | |
|---|---|---|---|---|---|---|---|---|---|---|---|---|---|
| Sample | MK | FS | SFF | QZ | Sand | Fiber | K₂O | SiO₂ | Na₂O | Water | Sum | (K,Na)OH M | W/C | psi |
| #53 | 6.51 | 16.80 | 2.00 | 9.00 | 45.00 | — | 3.34 | 4.52 | 1.48 | 11.35 | 100.00 | 9.51 | 0.38 | 25072 |
| #54 | 5.55 | 14.32 | 2.00 | 10.00 | 50.00 | — | 2.97 | 3.85 | 1.27 | 10.05 | 100.00 | 9.20 | 0.40 | 25681 |
| #55 | 4.91 | 12.67 | 2.93 | 9.76 | 48.78 | 1.95 | 2.83 | 3.41 | 1.21 | 11.56 | 100.00 | 7.76 | 0.51 | 20997 |
| #56 | 5.88 | 15.17 | 2.94 | 13.71 | 41.14 | — | 3.43 | 4.11 | 1.44 | 12.19 | 100.00 | 9.02 | 0.44 | 22154 |

*SFF = silica fume filler; QZ = crushed quartz; Fiber = steel fiber; Na₂O and K₂O added as hydroxides, and SiO₂ added as silica fume (e.g., Fe—Si alloying waste product) to prepare activator solutions

Example 10

Using the same procedure described in Example 1, additional GUHPC samples (Samples 57-64) were prepared. The samples were cured at room temperature and their compressive strengths were measured after curing for 28 days. In these samples, masonry sand was used as fine aggregate; and silica fume and/or zeolite were added as reactive filler. Crushed quartz (QZ) from U.S. Silica was used as weak reactive filler in Samples 62 and 64. The activator solutions were prepared by using predominantly sodium hydroxide and industrial waste silica fume from Norchem Inc. Strength enhancers used in these samples included aluminum hydroxide, sodium carbonate, sodium phosphate, sodium sulfate, sodium oxalate, and fluoride. Total addition of strength enhancers was less than about 1.0 wt % of the concrete mix. These were dissolved in water prior to dissolution of alkali hydroxides. No superplasticizer was added. The composition, W/C, concentration of alkali hydroxides in activator solution, and compressive strengths of the additional samples are shown in Table 11.

TABLE 11

Composition (wt %), W/C, molar concentration of alkali hydroxides in activator solution, and compression strength (psi) from additional GUHPC samples*

| | Dry components | | | | | | Activator | | | | | | |
|---|---|---|---|---|---|---|---|---|---|---|---|---|---|---|
| Sample | MK | BFS | SFF | ZT | QZ | Sand | K₂O | SiO₂ | Na₂O | Water | Sum | (Na,K)OH M | W/C | psi |
| #57 | 9.93 | 25.62 | 1.98 | 0.99 | — | 34.66 | 0.13 | 6.63 | 5.19 | 14.86 | 100.00 | 10.84 | 0.31 | 23804 |
| #58 | 10.56 | 27.26 | 1.97 | 0.98 | — | 29.51 | 0.39 | 7.06 | 5.53 | 16.74 | 100.00 | 10.69 | 0.34 | 20258 |

TABLE 11-continued

Composition (wt %), W/C, molar concentration of alkali hydroxides in activator solution, and compression strength (psi) from additional GUHPC samples*

| Sample | Dry components | | | | | | Activator | | | | | | | |
|---|---|---|---|---|---|---|---|---|---|---|---|---|---|---|
| | MK | BFS | SFF | ZT | QZ | Sand | $K_2O$ | $SiO_2$ | $Na_2O$ | Water | Sum | (Na,K)OH M | W/C | psi |
| #59 | 8.99 | 23.21 | 1.96 | 0.98 | — | 39.25 | 0.60 | 6.01 | 4.72 | 14.28 | 100.00 | 10.82 | 0.35 | 20529 |
| #60 | 11.34 | 29.26 | 1.96 | 0.98 | — | 24.55 | 0.58 | 7.58 | 5.93 | 17.82 | 100.00 | 11.05 | 0.34 | 20910 |
| #61 | 12.10 | 31.22 | 1.96 | 0.98 | — | 19.65 | 0.57 | 8.09 | 6.30 | 19.13 | 100.00 | 10.98 | 0.34 | 19760 |
| #62 | 5.67 | 14.64 | 1.97 | — | 9.87 | 49.35 | 0.42 | 3.83 | 3.49 | 10.76 | 100.00 | 10.13 | 0.43 | 22433 |
| #63 | 7.55 | 19.49 | 2.00 | — | — | 50.00 | — | 5.05 | 4.16 | 11.75 | 100.00 | 10.32 | 0.36 | 21596 |
| #64 | 6.52 | 16.82 | 1.96 | — | 8.80 | 44.02 | 0.31 | 4.35 | 3.86 | 13.37 | 100.00 | 9.06 | 0.45 | 20898 |

*SFF = silica fume filler; QZ = crushed quartz; Fiber = steel fiber; $Na_2O$ and $K_2O$ added as respective hydroxides, and $SiO_2$ added as silica fume (e.g., Fe—Si alloying waste product) to prepare activator solutions Example 11

Using a procedure similar to that described in Example 1, additional GUHPC samples (Samples 65-67) were prepared. The samples were cured at room temperature and their compressive strengths were measured after curing for 28 days. In these samples, masonry sand was used as fine aggregate; and silica fume from Norchem Inc. was used as submicron reactive filler. Crushed quartz (QZ) from U.S. Silica was used as weak reactive filler in Samples 65 and 66. Class F fly ash from Boral Material Technologies was used to replaced crushed quartz powder in Sample 67. The activator solutions were prepared by using commercially available sodium silicate solution (Ru™ sodium silicate solution, PQ Inc.), instead of dissolving silica fume in alkaline hydroxide solution. Sodium fluoride (NaF) at about 0.25 wt % of the concrete mix was added as a strength enhancer. No superplasticizer was added. The composition, W/C, concentration of alkali hydroxides in activator solution, and compressive strengths of the additional samples are shown in Table 12.

TABLE 12

Composition (wt %), W/C, molar concentration of alkali hydroxides in activator solution, and compression strength (psi) from additional GUHPC samples*

| Sample | Dry components | | | | | | Activator | | | | | | | |
|---|---|---|---|---|---|---|---|---|---|---|---|---|---|---|
| | MK | FS | SFF | QZ | FAF | Sand | $K_2O$ | $SiO_2$ | $Na_2O$ | Water | Sum | (Na,K)OH M | W/C | psi |
| #65 | 6.77 | 17.46 | 1.98 | 8.89 | — | 44.46 | 0.41 | 4.52 | 3.90 | 11.60 | 100.00 | 10.60 | 0.38 | 22485 |
| #66 | 5.51 | 14.22 | 1.99 | 9.95 | — | 49.74 | 0.13 | 3.68 | 3.70 | 11.08 | 100.00 | 9.90 | 0.45 | 20622 |
| #67 | 5.58 | 14.41 | 1.99 | — | 9.93 | 49.64 | 0.23 | 3.73 | 3.63 | 10.87 | 100.00 | 10.07 | 0.44 | 21448 |

*SFF = silica fume filler; QZ = crushed quartz; FFA = Class F fly ash

Example 12

Using the same procedure as described in Example 1, additional GUHPC samples (Samples 68-70) were prepared. The samples were cured at room temperature and their compressive strengths were measured after curing for 28 days. In these samples, masonry sand was used as fine aggregate; and silica fume from Norchem Inc. together with Class F fly ash from Boral Material Technologies were used as reactive filler in Samples 68 and 70. Silica fume together with crushed quartz (QZ) from U.S. silica was used as reactive filler in Sample 69. The activator solutions were prepared by dissolving silica fume from Norchem Inc. in alkaline hydroxide solution with $K_2O/Na_2O$ mass ratios at about 0.8. Sodium fluoride (NaF) at about 0.25 wt % of the concrete mix was added as a strength enhancer. No superplasticizer was added. The composition, W/C, concentration of alkali hydroxides in activator solution, and compressive strengths of the additional samples are shown in Table 13.

TABLE 13

Composition (wt %), W/C, molar concentration of alkali hydroxides in activator solution, and compression strength (psi) from additional GUHPC samples*

| Sample | Dry components | | | | | | | Activator | | | | | | | |
|---|---|---|---|---|---|---|---|---|---|---|---|---|---|---|---|
| | MK | FS | SFF | ZT | QZ | FAF | Sand | $K_2O$ | $SiO_2$ | $Na_2O$ | Water | Sum | (Na,K)OH M | W/C | psi |
| #68 | 6.31 | 16.29 | 2.98 | 0.99 | — | 8.95 | 44.73 | 2.05 | 4.04 | 2.63 | 11.03 | 100.00 | 10.43 | 0.39 | 22653 |
| #69 | 5.48 | 14.15 | 2.95 | — | 9.82 | — | 49.09 | 2.25 | 3.37 | 2.33 | 10.56 | 100.00 | 10.27 | 0.43 | 24582 |
| #70 | 5.46 | 14.10 | 2.96 | — | — | 9.88 | 49.39 | 2.02 | 3.51 | 2.45 | 10.23 | 100.00 | 10.47 | 0.42 | 23307 |

*SFF = silica fume filler; ZT = zeolite; QZ = crushed quartz; FAF = Class F fly ash; $Na_2O$ and $K_2O$ added as respective hydroxides, and $SiO_2$ added as silica fume (e.g., Fe—Si alloying waste product) to prepare activator solutions

Example 13

Using a procedure similar to that described in Example 1, additional GUHPC samples (Samples 71-88) were prepared. Mixing was conducted with a high intensive mixer (K-Lab Mixer from Lancaster Products). The samples were cured at room temperature and their compressive strengths were measured after curing for 28 days. In these samples, masonry sand was used as fine aggregate; and silica fume from Norchem Inc. together with crushed quartz (QZ) from U.S. Silica was used in Samples 71-79. Silica fume together with Class F fly ash from Boral Material Technologies were used as reactive filler in Samples 80 to 86. Zeolite was used as reactive filler in Samples 87 and 88. The activator solutions were prepared by dissolving silica fume from Norchem Inc. in alkaline hydroxide solution with $K_2O/Na_2O$ mass ratios at about 2 to about 3. Steel fiber from Bekaert Corporation was added to improve ductility in Samples 71, 73, 76, 81, 85, and 87. Sodium fluoride (NaF) at about 0.25 wt % of the concrete mix was added as a strength enhancer. No superplasticizer was added. The composition, W/C, concentration of alkali hydroxides in activator solution, and compressive strengths of the additional samples are shown in Table 14.

TABLE 14

Composition (wt %), W/C, molar concentration of alkali hydroxides in activator solution, and compression strength (psi) from additional GUHPC samples*

| Sample | Dry components | | | | | | | Activator | | | | | | | |
|---|---|---|---|---|---|---|---|---|---|---|---|---|---|---|---|
| | MK | BFS | SFF | QZ | FAF | Sand | Fiber | $K_2O$ | $SiO_2$ | $Na_2O$ | Water | Sum | (K,Na)OH M | W/C | psi |
| #71 | 6.37 | 16.43 | 1.95 | 8.78 | — | 43.88 | 2.50 | 3.38 | 4.41 | 1.44 | 10.87 | 100.00 | 9.90 | 0.37 | 23342 |
| #72 | 6.56 | 16.92 | 2.01 | 9.04 | — | 45.20 | — | 3.49 | 4.54 | 1.49 | 10.75 | 100.00 | 10.27 | 0.36 | 25686 |
| #73 | 6.39 | 16.50 | 1.96 | 8.81 | — | 44.07 | 2.51 | 3.40 | 4.43 | 1.45 | 10.48 | 100.00 | 10.27 | 0.36 | 25918 |
| #74 | 5.57 | 14.37 | 2.00 | 10.00 | — | 50.00 | — | 3.00 | 3.86 | 1.34 | 9.85 | 100.00 | 9.64 | 0.39 | 21200 |
| #75 | 5.64 | 14.55 | 2.00 | 10.00 | — | 50.00 | — | 3.08 | 3.92 | 1.36 | 9.45 | 100.00 | 10.21 | 0.37 | 24269 |
| #76 | 5.50 | 14.19 | 1.95 | 9.75 | — | 48.75 | 2.50 | 3.00 | 3.82 | 1.33 | 9.21 | 100.00 | 10.21 | 0.34 | 24652 |
| #77 | 4.63 | 11.94 | 2.00 | 11.00 | — | 55.00 | — | 2.55 | 3.09 | 1.14 | 8.65 | 100.00 | 9.08 | 0.43 | 20638 |
| #78 | 4.62 | 11.92 | 2.00 | 11.00 | — | 55.00 | — | 2.55 | 3.09 | 1.18 | 8.65 | 100.00 | 9.19 | 0.43 | 20700 |
| #79 | 4.93 | 19.77 | 2.00 | 9.00 | | 45.00 | | 2.80 | 4.02 | 1.73 | 10.75 | 100.00 | 9.71 | 0.36 | 21132 |
| #80 | 4.72 | 12.17 | 2.00 | — | 10.00 | 55.00 | — | 2.55 | 3.21 | 1.60 | 8.75 | 100.00 | 10.46 | 0.42 | 20343 |
| #81 | 4.60 | 11.86 | 1.95 | — | 9.75 | 53.62 | 2.50 | 2.49 | 3.13 | 1.56 | 8.53 | 100.00 | 10.46 | 0.42 | 21285 |
| #82 | 4.70 | 12.13 | 2.00 | — | 10.02 | 55.12 | — | 2.92 | 3.21 | 1.35 | 8.55 | 100.00 | 10.64 | 0.41 | 22952 |
| #83 | 4.58 | 11.82 | 1.95 | — | 9.77 | 53.74 | 2.51 | 2.85 | 3.12 | 1.32 | 8.33 | 100.00 | 10.64 | 0.41 | 23807 |
| #84 | 4.84 | 12.48 | 2.02 | — | 10.08 | 55.46 | — | 2.83 | 3.30 | 1.41 | 7.59 | 100.00 | 11.78 | 0.36 | 27415 |
| #85 | 4.71 | 12.16 | 1.97 | — | 9.83 | 54.06 | 2.52 | 2.76 | 3.21 | 1.38 | 7.40 | 100.00 | 11.78 | 0.35 | 23369 |
| #86 | 4.80 | 12.37 | 2.00 | — | 10.00 | 55.00 | — | 2.81 | 3.27 | 1.40 | 8.35 | 100.00 | 11.30 | 0.38 | 20816 |
| #87 | 6.18 | 15.95 | 1.95 | — | 0.97** | 53.62 | 2.50 | 3.36 | 4.13 | 1.42 | 9.90 | 100.00 | 10.45 | 0.36 | 22688 |
| #88 | 6.34 | 16.36 | 2.00 | — | 01.00** | 55.00 | — | 3.45 | 4.24 | 1.46 | 10.15 | 100.00 | 10.45 | 0.36 | 21532 |

*SFF = silica fume filler; QZ = crushed quartz; FAF = Class F fly ash; $Na_2O$ and $K_2O$ added as hydroxides, and $SiO_2$ added as silica fume (e.g., Fe—Si alloying waste product) to prepare activator solutions
**Zeolite

Example 14

Using the same procedure as described in Example 13, additional GUHPC samples (Samples 89-92) were prepared. Mixing was conducted with a high intensive mixer (K-Lab Mixer from Lancaster Products). Initial setting time was determined using a Vicat system. The samples were cured at room temperature and their compressive strengths were measured after curing for 3 hours, 6 hours, 1 day, 3 days, 7 days, 15 days, 21 days, and 28 days. In these samples, masonry sand was used as fine aggregate; and silica fume from Norchem Inc. together with Class F fly ash from Boral Material Technologies were used as reactive filler in Sample 89. Silica fume together with crushed quartz (QZ) from U.S. Silica were used as reactive filler in Samples 90-92. Activator solutions were prepared by dissolving silica fume from Norchem Inc. in alkaline hydroxide solution with $K_2O/Na_2O$ mass ratios at about 2.2. No superplasticizer was added. Sodium fluoride (NaF) was added as a strength enhancer. The composition, W/C, and concentration of alkali hydroxides in activator solution of the additional samples are shown in Table 15. Compressive strengths of Samples 89-92 at the above indicated times are shown in Table 16. A plot of these compressive strengths versus curing time is shown in FIG. 1.

TABLE 15

Composition (wt %), W/C, molar concentration of alkali hydroxides in activator solution, and compression strength (psi) from additional GUHPC samples*

| | Dry components | | | | | Activator | | | | | | |
|---|---|---|---|---|---|---|---|---|---|---|---|---|
| Sample | MK | BFS | SFF | QZ | FFA | Sand | $K_2O$ | $SiO_2$ | $Na_2O$ | Water | Sum | (K,Na)OH M | W/C |
| #89 | 4.82 | 12.43 | 2.01 | — | 10.04 | 55.24 | 2.82 | 3.28 | 1.41 | 7.94 | 100.00 | 11.30 | 0.38 |
| #90 | 6.56 | 16.92 | 2.01 | 9.04 | — | 45.20 | 3.49 | 4.54 | 1.49 | 10.75 | 100.00 | 10.27 | 0.36 |
| #91 | 5.64 | 14.55 | 2.00 | 10.00 | — | 50.00 | 3.08 | 3.92 | 1.36 | 9.45 | 100.00 | 9.96 | 0.37 |
| #92 | 4.62 | 11.92 | 2.00 | 11.00 | — | 55.00 | 2.55 | 3.09 | 1.18 | 8.65 | 100.00 | 9.19 | 0.43 |

*SFF = silica fume filler; QZ = crushed quartz; FAF = Class F fly ash; $Na_2O$ and $K_2O$ added as hydroxides, and $SiO_2$ added as silica fume (e.g., Fe—Si alloying waste product) to prepare activator solutions

TABLE 16

Compressive strength (psi) of samples cured for different times

| | Initial/final | Compressive strength (psi) | | | | | | | |
|---|---|---|---|---|---|---|---|---|---|
| Sample | setting times | 3 hours | 6 hours | 24 hours | 3 days | 7 days | 15 days | 21 days | 28 days |
| #89 | 25/35 min | 1095 | 2339 | 7026 | 13794 | 17360 | 21361 | 20949 | 23633 |
| #90 | 63/75 min | 1512 | 2846 | 7518 | 15278 | 19351 | 24268 | 22918 | 27211 |
| #91 | 50/57 min | 1312 | 2567 | 5780 | 14435 | 19221 | 25390 | 29104 | 25847 |
| #92 | 42/68 min | 1257 | 2016 | 6043 | 13823 | 17972 | 22080 | 23524 | 23174 |

Example 15

Using the same procedure as described in Example 13, additional GUHPC samples (Samples 93-98) were prepared. Mixing was conducted with a high intensive mixer (K-Lab Mixer from Lancaster Products). The samples were cured at room temperature and their compressive strengths were measured after curing for 3 hours, 6 hours, 1 day, 3 days, 7 days, 15 days, 21 days, and 28 days. In these samples, masonry sand was used as fine aggregate; and silica fume from Norchem Inc. together with low CaO Class F fly ash from Brandon Shores Power Stations, Baltimore, Md. (Separation Technologies) was used as reactive filler in Samples 93, 95, 97, and 99. Silica fume from Norchem Inc. together with high CaO Class F fly ash from Limestone Power Station, Jewett, Tex. (Headwater Resources) was used as reactive filler in Samples 94, 96, 98, and 100. Activator solutions were prepared by dissolving silica fume from Norchem Inc. in alkaline hydroxide solution with $K_2O/Na_2O$ mass ratios at about 2.2. No superplasticizer was added. Sodium fluoride (NaF) at about 0.25 wt % of the concrete mix was added as a strength enhancer. The composition, W/C, and concentration of alkali hydroxides in activator solution the additional samples are shown in Table 17. Compressive strengths of Samples 93-98 at the above indicated times are shown in Table 18.

TABLE 17

Composition (wt %), W/C, molar concentration of alkali hydroxides in activator solution, and compression strength (psi) from additional GUHPC samples*

| | Dry component | | | | | Activator | | | | | (K,Na)OH | | |
|---|---|---|---|---|---|---|---|---|---|---|---|---|---|
| Sample | MK | BFS | SFF | FFA | Sand | $K_2O$ | $SiO_2$ | $Na_2O$ | Water | Sum | (M) | W/C | Type of FFA |
| #93 | 5.64 | 14.55 | 2.00 | 10.00 | 50.00 | 3.08 | 3.92 | 1.36 | 9.45 | 100.00 | 10.21 | 0.38 | Low CaO |
| #94 | 5.64 | 14.55 | 2.00 | 10.00 | 50.00 | 3.08 | 3.92 | 1.36 | 9.45 | 100.00 | 10.21 | 0.38 | High CaO |
| #95 | 4.62 | 11.92 | 2.00 | 11.00 | 55.00 | 2.55 | 3.09 | 1.18 | 8.65 | 100.00 | 9.19 | 0.43 | Low CaO |
| #96 | 4.62 | 11.92 | 2.00 | 11.00 | 55.00 | 2.55 | 3.09 | 1.18 | 8.65 | 100.00 | 9.19 | 0.43 | High CaO |
| #97 | 4.80 | 12.37 | 2.00 | 10.00 | 55.00 | 2.81 | 3.27 | 1.40 | 8.35 | 100.00 | 10.78 | 0.38 | Low CaO |
| #98 | 4.80 | 12.37 | 2.00 | 10.00 | 55.00 | 2.81 | 3.27 | 1.40 | 8.35 | 100.00 | 10.78 | 0.38 | High CaO |
| #99 | 6.53 | 16.85 | 2.00 | 9.00 | 45.00 | 3.47 | 4.52 | 1.48 | 11.15 | 100.00 | 9.90 | 0.36 | Low CaO |
| #100 | 6.53 | 16.85 | 2.00 | 9.00 | 45.00 | 3.47 | 4.52 | 1.48 | 11.15 | 100.00 | 9.90 | 0.36 | High CaO |

*SFF = silica fume filler; FAF = Class F fly ash; $Na_2O$ and $K_2O$ added as respective hydroxides, and $SiO_2$ added as silica fume (e.g., Fe—Si alloying waste product) to prepare activator solutions

TABLE 18

Compressive strength (psi) of samples cured for different times

| Sample | 3 hours | 6 hours | 24 hours | 3 days | 7 days | 14 days | 21 days | 28 days |
|---|---|---|---|---|---|---|---|---|
| #93 | 2497 | 5793 | 10468 | 16210 | 19322 | 24645 | 21210 | 22506 |
| #94 | 2107 | 4403 | 10875 | 15940 | 19357 | 20634 | 21896 | 21982 |
| #95 | 1430 | 2098 | 6663 | 12054 | 15287 | 19263 | 20143 | ND |
| #96 | 1233 | 2452 | 7263 | 12625 | 16905 | 20968 | ND | ND |

TABLE 18-continued

Compressive strength (psi) of samples cured for different times

| Sample | 3 hours | 6 hours | 24 hours | 3 days | 7 days | 14 days | 21 days | 28 days |
|---|---|---|---|---|---|---|---|---|
| #97 | 1313 | 3207 | 9355 | 13420 | 16932 | 18048 | 20901 | 20873 |
| #98 | 1666 | 3609 | 9179 | — | 18621 | 20589 | 20649 | ND |
| #99 | 3243 | 6272 | 7795 | 12772 | 15381 | 20950 | ND | ND |
| #100 | 2445 | 3453 | 8744 | 12625 | 18931 | 20968 | ND | ND |

ND = not determined

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

That which is claimed is:

1. A geopolymeric composite ultra high performance concrete (GUHPC) mix, comprising:
   (a) a binder comprising one or more selected from the group consisting of reactive aluminosilicate and reactive alkali-earth aluminosilicate;
   (b) an alkali activator comprising an aqueous solution of metal hydroxide and metal silicate;
   (c) one or more aggregate that has a particle size between about 0.075 and 10 mm; and
   (d) one or more filler that has a particle size of between about 0.05 and 75 μm,
   wherein a packing density of all solid components in the GUHPC mix is at least 0.5 (v/v), and the binder, aggregate and filler have the same or different chemical compositions.

2. The GUHPC mix of claim 1, wherein the binder comprises about 10 to 50 wt % of the GUHPC mix.

3. The GUHPC mix of claim 1, wherein the binder comprises one or more reactive aluminosilicate comprising about 0 to 30 wt % of the GUHPC mix.

4. The GUHPC mix of claim 3, wherein the one or more reactive aluminosilicate is selected from the group consisting of metakaolin, reactive aluminosilicate glasses, and ultrafine Class F fly ash.

5. The GUHPC mix of claim 1, wherein the binder comprises one or more reactive alkali-earth aluminosilicate comprising about 2 to 40 wt % of the GUHPC mix.

6. The GUHPC mix of claim 5, wherein the one or more reactive alkali-earth aluminosilicate are selected from the group consisting of granulated blast furnace slag, vitreous calcium aluminosilicate (VCAS), Class C fly ash, and concrete kiln dust.

7. The GUHPC mix of claim 1, wherein the binder comprises reactive aluminosilicate and reactive alkali-earth aluminosilicate.

8. The GUHPC mix of claim 7, wherein the mass of the reactive aluminosilicate is up to about 10 times the mass of the reactive alkali-earth aluminosilicate.

9. The GUHPC mix of claim 7, wherein reactive aluminosilicate comprises about 2 to 15 wt % of the GUHPC mix.

10. The GUHPC mix of claim 7, wherein the mass of the reactive alkali-earth aluminosilicate is up to about 20 times the mass of the reactive aluminosilicate.

11. The GUHPC mix of claim 7, wherein the reactive alkali-earth aluminosilicate comprises about 8 to about 25 wt % of the GUHPC mix.

12. The GUHPC mix of claim 1, wherein the one or more filler comprises up to about 35 wt % of the GUHPC mix.

13. The GUHPC mix of claim 1, wherein the one or more filler has a particle size of between 1 and 75 μm, and is selected from the group consisting of crushed quartz, Class F fly ash, Class C fly ash, zeolite, ground glass, metakaolin, ground granulated blast furnace slag, ultrafine furnace slag, and ultrafine fly ash.

14. The GUHPC mix of claim 1, wherein the one or more filler has a particle size of between about 0.05 and 1 μm, and is selected from the group consisting of silica fume, precipitated silica, ultrafine calcium carbonate, micron alumina, and submicron particles of metal oxides.

15. The GUHPC mix of claim 1, wherein the one or more aggregate comprises up to about 75 wt % of the GUHPC mix.

16. The GUHPC mix of claim 1, wherein the one or more aggregate comprises one or more coarse aggregate having a particle size of between about 0.075 and about 10 mm that is selected from the group consisting of quartz sand, granite, basalt, gneiss, crushed granulated blast furnace slag, limestone and calcined bauxite sand.

17. The GUHPC mix of claim 1, wherein the one or more aggregate comprises one or more fine aggregate with a particle size of between about 0.075 and 0.75 mm.

18. The GUHPC mix of claim 1, wherein the alkali activator solution is about 10 to 40 wt % of the GUHPC mix.

19. The GUHPC mix of claim 1, wherein the metal hydroxide comprises sodium hydroxide, potassium hydroxide, or both.

20. The GUHPC mix of claim 1, wherein the metal hydroxide comprises about 2 to 10 wt % as $M_2O$ of the GUHPC mix.

21. The GUHPC mix of claim 1, wherein the metal silicate comprises sodium silicate, potassium silicate, or both.

22. The GUHPC mix of claim 1, wherein the metal silicate comprises about 2 to 10 wt % as $SiO_2$ of the GUHPC mix.

23. The GUHPC mix of claim 1, wherein the alkali activator comprises water at about 4 to 25 wt % of the GUHPC mix.

24. The GUHPC mix of claim 1 further comprises one or more fiber, comprising up to about 15 wt % of the GUHPC mix.

25. The GUHPC mix of claim 24, wherein the one or more fiber is selected from the group consisting of organic fiber, glass fiber, mineral fiber, basalt fiber, carbon fiber, nano fiber, and metal fiber.

26. The GUHPC mix of claim 1, further comprising one or more strength enhancer, comprising up to about 2 wt % of the GUHPC mix.

27. The GUHPC mix of claim 26, wherein the one or more strength enhancer is selected from the group consisting of aluminum hydroxide, alkali carbonate, alkali phosphate, alkali sulfate, alkali oxalate, and alkali fluoride.

28. The GUHPC mix of claim 1, further comprising superplasticizer solids, comprising up to about 5 wt % of the GUHPC mix.

29. The GUHPC mix of claim 1, further comprising a set retarder, comprising up to about 5 wt % of the GUHPC mix.

30. The GUHPC mix of claim 1, wherein the packing density of all solid components in the GUHPC mix is at least 0.6 (v/v).

31. The GUHPC mix of claim 1, wherein the GUHPC mix results in a product with a 28-day compressive strength of at least about 10,000 psi.

32. The GUHPC mix of claim 1, wherein the GUHPC mix results in a product with a 28-day compressive strength of at least about 20,000 psi.

33. The GUHPC mix of claim 1, wherein the GUHPC mix results in a product with a 28-day compressive strength of at least about 25,000 psi.

34. The GUHPC mix of claim 1, wherein the GUHPC mix results in a product with a setting time of about 30 minutes to 3 hours.

35. The GUHPC mix of claim 1, wherein the GUHPC mix results in a product with a setting temperature between about 0° C. and 150° C.

36. The GUHPC mix of claim 1, wherein the activator solution has a molar concentration of alkali hydroxide from about 5 to about 15.

37. The GUHPC mix of claim 1, wherein the GUHPC mix has a water-to-geopolymer solids mass ratio (W/C) of between about 0.12 and about 0.65.

* * * * *